(12) United States Patent
Srocka

(10) Patent No.: US 12,235,209 B2
(45) Date of Patent: Feb. 25, 2025

(54) DEVICE AND METHOD FOR MEASURING THE PROFILE OF FLAT OBJECTS COMPRISING UNKNOWN MATERIALS

(71) Applicant: SENTRONICS METROLOGY GMBH, Mannheim (DE)

(72) Inventor: Bernd Srocka, Erfurt (DE)

(73) Assignee: SENTRONICS METROLOGY GMBH, Mannheim (DE)

( * ) Notice: Subject to any disclaimer, the term of this patent is extended or adjusted under 35 U.S.C. 154(b) by 264 days.

(21) Appl. No.: 17/769,830

(22) PCT Filed: Oct. 14, 2020

(86) PCT No.: PCT/EP2020/078927
§ 371 (c)(1),
(2) Date: Apr. 18, 2022

(87) PCT Pub. No.: WO2021/078609
PCT Pub. Date: Apr. 29, 2021

(65) Prior Publication Data
US 2022/0390355 A1    Dec. 8, 2022

(30) Foreign Application Priority Data
Oct. 25, 2019 (EP) .................................... 19205397

(51) Int. Cl.
*G01N 21/21*    (2006.01)
*G01B 11/06*    (2006.01)

(52) U.S. Cl.
CPC ........ *G01N 21/211* (2013.01); *G01B 11/0641* (2013.01)

(58) Field of Classification Search
CPC .. G01N 21/211; G01N 21/21; G01B 11/0641; G01B 9/0207
See application file for complete search history.

(56) References Cited

U.S. PATENT DOCUMENTS

| 5,793,480 A * | 8/1998 | Lacey | G01N 21/211 |
| | | | 356/507 |
| 6,856,384 B1 * | 2/2005 | Rovira | G01B 11/0608 |
| | | | 356/73 |

(Continued)

FOREIGN PATENT DOCUMENTS

EP    3 770 546 A1    1/2021

OTHER PUBLICATIONS

Kim et al., "Single-shot characterization of multi-film structures based on combined spectral interferometry and spatially recorded spectroscopic ellipsometry," Applied Optics, Jul. 20, 2019, vol. 58, No. 21, pp. 5637-5643 (Year: 2019).*
Yun et al., "Novel combined measurement system to characterize film structures by spectral interferometry and ellipsometry," Optics Express, Dec. 24, 2018, vol. 26, No. 26, pp. 34396-34411.

(Continued)

*Primary Examiner* — Tarifur R Chowdhury
*Assistant Examiner* — Akbar H. Rizvi
(74) *Attorney, Agent, or Firm* — Oliff PLC

(57) ABSTRACT

A method and device for measuring the profile of the surface of a flat object of unknown materials, including an interferometry measuring system, ellipsometry measuring system, beam splitter for splitting a light beam of a light source into an interferometry light beam and an ellipsometry light beam, and an analysis unit designed to ascertain the profile height in the measured region on the object surface from an analysis beam analyzed in a detector unit of the interferometry measuring system and a sensor beam received in an ellipsometry sensor. The interferometry measuring system includes a beam divider, reference mirror, and the detector unit, and the ellipsometry measuring system includes a polarizer for polarizing an ellipsometry light beam and transmitting same onto the measuring region on the object surface as well as the ellipsometry sensor, which includes a polarization filter in order to determine the polarization state of a received sensor beam.

18 Claims, 7 Drawing Sheets

(56) References Cited

U.S. PATENT DOCUMENTS

| | | | | |
|---|---|---|---|---|
| 2004/0145747 | A1* | 7/2004 | Jasapara | G01B 11/105 356/485 |
| 2005/0036143 | A1* | 2/2005 | Huang | G01J 4/04 356/369 |
| 2010/0195112 | A1* | 8/2010 | Davidson | G01B 9/02067 356/498 |
| 2011/0205529 | A1* | 8/2011 | Gross | H01J 65/06 313/624 |
| 2014/0168637 | A1* | 6/2014 | Wan | G01B 9/02022 356/73 |
| 2016/0377412 | A1* | 12/2016 | Li | G01B 11/0641 356/630 |
| 2018/0172578 | A1* | 6/2018 | Fiolka | G02B 27/10 |
| 2019/0033211 | A1* | 1/2019 | Neil | G01N 21/4788 |

OTHER PUBLICATIONS

Zhan et al., "Microellipsometer with radial symmetry," Applied Optics, Aug. 1, 2002, vol. 41, No. 22, pp. 4630-4637.

Kim et al., "Single-shot characterization of multi-film structures based on combined spectral interferometry and spatially recorded spectroscopic ellipsometry," Applied Optics, Jul. 20, 2019, vol. 58, No. 21, pp. 5637-5643.

Jan. 20, 2021 International Search Report issued in International Patent Application No. PCT/EP2020/078927.

Jan. 20, 2021 Written Opinion of the International Searching Authority issued in International Patent Application No. PCT/EP2020/078927.

Apr. 26, 2022 International Preliminary Report on Patentability issued in International Application No. PCT/EP2020/078927.

* cited by examiner

DEVICE AND METHOD FOR MEASURING THE PROFILE OF FLAT OBJECTS COMPRISING UNKNOWN MATERIALS

The present invention relates to a device for measuring the profile of flat objects comprising unknown materials and to a corresponding method. The device comprises an optical measuring system based on interferometric measurement.

BACKGROUND

In several industry sectors, flat products are measured for their surface profile using optical imaging methods. In the semiconductor industry, these products include, among other things, wafers. Wafers are slices of semiconductor, glass or ceramic materials. In certain applications, the wafers are typically inspected over their entire surface or at least over large partial areas. The circuits "chips" are produced on the wafers, which later fulfill a wide range of tasks in electronic devices for computing, sensor technology, control and monitoring. During the production of the chips, a variety of measuring tasks are required for quality control. One example is the necessary measurement of the flatness of the chip surface after the CMP steps (CMP=Chemo-Mechanical Polishing) to be carried out multiple times. These steps are performed in order to have a flat starting surface again for subsequent process steps. For today's structure widths, the flatness requirements are in the range of a few to 100 nm. Typically, error patterns that occur have lateral expansions of a few μm to mm.

Similar profile measuring tasks are to be performed in further process steps. For example, methods are currently being developed for stacking multiple chips in a composite. In doing so, the use of raised contacting structures is to be almost completely eliminated. These methods are being investigated both for integration in a wafer composite and for individual chips that are placed in each case on top of a chip still situated in the wafer composite. Here, too, there is a need for accurate and fast profile measurement in order to guarantee the high demands on the planarity of the surfaces (in the lower nanometer range). The typical sizes for the contact structures of these methods are diameters in the single-digit μm range and profile heights of a few nm to several 10 nm.

For the exemplarily mentioned and for similar tasks, fast and accurate measuring methods are needed, which allow a precise measurement of height profiles that is as fast as possible. A particular challenge is that the surfaces to be measured consist of frequently changing materials and can also be covered with one or more transparent layers. However, the profile measurement should exactly reflect the surface of the entire material composite and not be falsified by measurement criteria or layer systems. Analogous tasks are to be solved for other structures and in other industry sectors.

Common to all these applications is the need for precise inspection of the surface profiles of very flat objects without distortion by underlying material combinations and the desire for high measurement speed. Such objects are wafers, displays and the like. Furthermore, it is common to these applications that the underlying material combinations and the thicknesses of the layer structures are often not known with sufficient accuracy. The applications also have in common the use of sensors for generating profile and/or height data of the inspected structures.

Conventional methods for height measurement use point sensors, line sensors or area sensors. Area sensors based on methods such as deflectometry or white light interferometer have the advantage of detecting an area as a whole. In deflectometry, the surface to be measured is used as a mirror through which a regularly structured light source is viewed. The height variation of the object is reflected in the distortion of this mirror image and can be extracted therefrom. In white-light interferometry, a series of images is taken at different distances from the object or from the interferometer mirror. The signal waveform for each point in the image within the series is then used to determine the respective profile height at that point. Line sensors use, e.g., triangulation, stereometry or chromatic confocal imaging. All these methods have in common that the used signals of these optical methods are influenced by the materials and also by the possibly existing transparent layers. Without the exact knowledge of the underlying material combinations and the thicknesses of the layer structures, a sufficiently accurate consideration of these structures, e.g. in the form of a correction of the recorded measurement values, is not possible. This knowledge is often not available. Known in the art is to cover the critical surfaces with a thin metal layer and to perform the profile measurement thereon. There is great interest in replacing this method, which is classified as destructive, with a non-destructive method that can solve the measuring task.

U.S. Pat. No. 6,856,384 B1 proposes to determine correction factors for the improvement of an interferometry measurement by means of an ellipsometry measurement performed afterwards. In this case, several ellipsometry measurements are carried out, which only have to measure the same measuring range on a surface as the interferometry measurement. The combination is said to be advantageous because some components of the measurement system can be used for both measurements. However, the optical measuring system of U.S. Pat. No. 6,856,384 B1 requires that the materials of the surface step to be detected are known, uniform in composition, thickness and flatness, and can be modeled. Furthermore, only individual step heights can be determined within an acceptable measuring time since the measuring system is limited to point sensors.

SUMMARY

Thus, the object of the invention is to propose an improved device and an improved method by means of which the measurement of a surface profile of a flat object provides reliable and accurate results even if the object comprises different materials on its surface. In particular, it should be possible to carry out a measurement with high accuracy in a shorter time without falsification caused by the structures and layers lying under the surface.

The present object is achieved by a device for profile measurement of flat objects comprising unknown materials having the features of claim 1. The object is also achieved by a system having the features of claim 2 as well as by a method having the features of claim 18.

According to the invention, the object is achieved by a device for measuring the profile of an object comprising unknown materials, which device comprises, in addition to an optical interferometry measuring system, an ellipsometry measuring system, a beam splitter and an analysis unit. The interferometry measuring system and the ellipsometry measurement system operate in parallel in terms of time, so that the analysis unit can process the sensor data from the two measuring systems simultaneously.

The beam splitter splits a light beam from a light source into an interferometry light beam and an ellipsometry light beam. The interferometry light beam is fed to the optical interferometry measuring system, while the ellipsometry light beam is simultaneously fed to the ellipsometry measuring system.

The optical interferometry measuring system has a beam divider which divides the interferometry light beam of the light source into a reference beam and a measuring beam. The reference beam is reflected at a mirror (reference mirror) of the system and directed back to the beam divider as a mirror beam. The measuring beam is directed to a measurement region on the object surface of the object to be measured and reflected there. After reflection, it is directed back to the beam divider as an object beam and interferes here with the mirror beam to form an analysis beam, which is fed to a detector unit of the interferometry measuring system. The detector unit is configured to receive and analyze the analysis beam. From the resulting interferometric superpositions of the two beams and the resulting interference signal intensities, the profile height of the surface can be inferred.

However, this value is distorted by the different materials of the object. To correct these interference signal intensities, parameters are used which are obtained by means of an ellipsometry measurement.

It has proven advantageous that a single ellipsometry measurement is sufficient to determine the correction factors. Thus, only one additional ellipsometry measurement is performed per interferometry measurement.

The device according to the invention and the corresponding system are adapted and designed to determine surfaces and profiles of objects as well as their structures if the objects include an unknown material and/or layer structure. It is not necessary that the materials and layers of the object are homogeneous.

The ellipsometry measuring system used for correction comprises a polarizer for polarizing the ellipsometry light beam and transmitting it to the measurement region on the object surface of the object to be measured. An ellipsometry sensor has a polarization filter so that the polarization of the received light beam can be determined. Thus, the polarization state of the sensor beam can be analyzed. After passing through the polarizer, the ellipsometry light beam is polarized and directed to the measurement region on the object surface. After reflection at the measurement region, the ellipsometry beam is directed, as a sensor beam, to the ellipsometry sensor so that it impinges there after filtering by means of the polarization filter.

In the analysis unit, the sensor beam received from the ellipsometry sensor is now analyzed. From the analysis results, parameters are determined which can be used for a correction of the measurement result of the interferometry measurement. Preferably, the parameters referred to as ellipsometry data are values reflecting an effective refractive index and an effective absorption coefficient of the material combination to be measured in the measurement region of the object. By means of said ellipsometry data, the intensities measured in the interferometry measuring system are corrected in such a manner that the actual profile height of the object surface in the measurement region can be inferred and this profile height can be calculated. Thus, it is possible to correct the influence of different materials of the surface of the object.

Advantageously, by simultaneously measuring interferometry signals and ellipsometry signals, the invention makes it possible to measure surface structures and their profiles on unknown materials or samples having locally changing materials without destroying or changing the material sample and without explicitly modeling the layer system to be measured. Currently, the practice is to provide a metal layer of constant thickness on a sample. This results in a surface structure with a uniform material that corresponds to the surface structure without the applied layer. However, the examined sample is no longer usable after the metal coating has been applied. This disadvantage of the prior art is eliminated by the present invention since no destruction or alteration of the object to be examined takes place.

The use of the additional ellipsometry measurement and consideration of the measurable polarization effects thus allows the phase shifts caused by the local material differences to be eliminated. The correction parameters determined from the ellipsometry measurement are used for this purpose.

The present object is also achieved by a system for measuring the profile of an object surface using the device just described as well as a light source for generating a monochromatic light beam and a movement unit for carrying out a relative movement between the device and the object to be measured.

Since not only a measurement point or measurement region on the object to be measured is to be observed, a relative movement between the object and the measuring device must be carried out. The relative movement between the object to be measured and the measuring device can preferably be implemented by a movement of the measuring device. In doing so, the object to be measured can remain in its position. Alternatively or additionally, the object to be measured can be moved relative to the measuring device. For example, for this purpose, the object can be held on a carriage which is moved by a drive unit in the desired manner. Usually, a translatory movement in one dimension is advantageous. If both the object to be measured and the device are designed to be movable, the measurement region can be moved on an object surface so that, for example, entire wafers can be measured automatically. This makes it possible to automate the measuring method according to the invention, as described below.

In a preferred embodiment, the carriage can comprise a holder for receiving the object, the holder being moved by the movement unit. For example, it is possible for the holder or the carriage to be moved in a back and forth movement while the device is moved in a movement direction perpendicular thereto.

The method according to the invention for detecting an object surface of an object comprising unknown materials and for measuring the surface profile uses an interferometry measurement and a simultaneously performed ellipsometry measurement. A monochromatic light beam emitted from a light source is emitted in the direction of the optical device and split into an interferometry light beam and an ellipsometry light beam by means of a beam splitter. Preferably, the split light beams can be perpendicular to each other. The interferometric light beam is used to perform an interferometric measurement in which the interferometric light beam is directed to a measurement region of the object surface to be measured. In the interferometric measurement, the interferometry light beam can be divided into a measuring beam and a reference beam, which, after reflection at the measurement region and a mirror, respectively, interfere with each other and reach a detector unit for analyzing the analysis signal or measuring the light intensities of the interference pattern.

The split ellipsometry light beam is used to perform an ellipsometry measurement on the measurement region of the object surface, preferably using an optical interferometry measuring system. To improve the measurement results, a monitor signal of the light source is optionally and preferably used to determine the output intensity of the light source and used to determine correction parameters from the ellipsometry measurement. Taking into account the output intensity of the light source, correction parameters are calculated from the results of the ellipsometry measurement. These correction parameters preferably comprise an effective refractive index and an effective absorption coefficient of the object at the considered measurement point or measurement region. The correction parameters can also be determined without considering the output intensity.

Another step of the method according to the invention provides for correcting the measurement values determined with the interferometry measurement by means of the correction parameters from the ellipsometry measurement. From the corrected interferometry measurement values and the correction parameters, the profile height of the measurement region at the object surface is determined. Thus, the determination of the profile height at the surface of an unknown material of an object is possible. Possible distortions of the interferometry measurement are corrected by the correction parameters.

By using ellipsometry measurement, it is not necessary to provide a model of the whole sample, thus, the object to be measured. It is sufficient that only the total effective effect of the surface of the unknown material is measurable. This effective optical effect is used to compensate for the effects on the interferometry measurement signal caused by the different material properties and thus to be able to infer the actual height of the surface in the measurement region.

In a preferred embodiment of the invention, the beam divider and/or the beam splitter can be designed as a semi-transparent mirror. This makes it possible to implement a simple division of a light beam, for example an interferometry light beam and an ellipsometry light beam. With a mirror arrangement of 45°, the two divided beams can have an angle of 90° to each other.

In a further preferred embodiment, a lens is provided in the beam path of the device upstream of the measurement region on the object surface of the object to be measured. The object directs the light beams in such a manner that the polarized ellipsometry light beam impinges on the measurement region on the object surface at a predetermined angle and is reflected. The measuring beam of the interferometry measurement preferably impinges on the measurement region on the object surface at a right angle (or near right angle) and is also reflected perpendicularly from the object.

In a preferred embodiment of the device according to the invention, the ellipsometry measuring system comprises a mirror in the beam path of the ellipsometry light beam, which is arranged in such a manner that the ellipsometry light beam impinges perpendicularly on the polarizer before it reaches the object to be measured. Preferably, the lens is arranged between the polarizer and the object.

Preferably, the device according to the invention comprises tube optics in the beam path upstream of the detector unit of the interferometry measuring system, which tube optics focuses the analysis beam in such a manner that the focal point lies on the detector unit or the sensor surface of the detector unit. Preferably, alternatively or additionally, tube optics can be provided in the beam path of the ellipsometry measuring system upstream of the ellipsometry sensor, which tube optics focuses the sensor beam on the ellipsometry sensor, i.e. the sensor beam is focused in such a manner that the focal point lies on the sensor surface of the ellipsometry sensor.

In a preferred embodiment, the light source of the system according to the invention is a laser. Laser light is particularly suitable for performing interferometry and ellipsometry measurements because it provides a monochromatic light. The wavelengths of the light are sufficiently constant and can be precisely defined.

Preferably, the light source of the system according to the invention comprises a monitor diode by means of which the output intensity of the light source is determined and monitored. In be this manner, it can determined uniquely with which intensity the light from the light source enters the device according to the invention so that the light intensity is available for the measurements and analyses, in particular the analysis in the ellipsometry measuring system.

In a preferred embodiment of the system, multiple light sources are provided, each for generating a monochromatic light beam. Particularly preferably, the light beams of the individual light sources have different wavelengths, wherein very preferably none of the wavelengths of a light beam is an integral multiple of the wavelength of another light beam. In a particularly preferred embodiment of the system, the light beams are focused in beam shaping optics. Preferably, the beam shaping optics are arranged upstream of the beam splitter in the beam path.

When using multiple light sources, the ellipsometry measuring system preferably comprises multiple ellipsometry sensors with polarization filters that serve for analyzing the polarization state of the received sensor beam. Particularly preferably, one ellipsometry sensor per used wavelength of the present light beams is available. As a rule, therefore, one ellipsometry sensor is used per light source.

In the case that multiple ellipsometry sensors are used, an optical separating element is preferably present in the device according to the invention. The optical separating element performs a wavelength-specific separation of the sensor beam by providing the wavelengths of all light beams. In this manner, the components of individual wavelengths can be separated. Preferably, the separating element is arranged in the beam path in such a manner that arranging the sensor beam takes place before the latter impinges on the ellipsometry sensors.

In a particularly preferred embodiment, the optical separating element is designed as a dichroic mirror. The dichroic mirror makes it possible to exactly separate a specific wavelength or a light beam of a specific wavelength in a simple manner. If more than two light sources with different wavelengths are used, it is preferable to provide a series connection of several separating elements in order to out-couple several light beams of one wavelength.

In a preferred embodiment, the device comprises line sensors, which are preferably used in both the interferometry measuring system and the ellipsometry measuring system. Preferably, line scan cameras or multi-channel line scan cameras are used. The use of lines with many pixels allows parallel measurement and significantly increases the measurement speed of the device.

Preferably, for example, a four-channel line scan camera can be used to allow simultaneous measurement of four polarization states, in particular when using four polarization filters.

In a preferred embodiment, the detector unit of the device according to the invention comprises a time-delayed integration camera. Very preferably, the detector unit comprises a color time-delayed integration camera. In a particularly preferred embodiment, multi-channel line scan cameras are used. They are very preferably configured as time-delayed integration multi-channel line scan cameras.

Another preferred embodiment of the device provides an ellipsometry sensor as configured a time-delayed integration (TDI) camera. Preferably, a line scan camera is used, very preferably a TDI line scan camera, particularly preferably a multi-channel TDI line scan camera. In a particularly preferred variant, the ellipsometry measuring system comprises a four-channel TDI line scan camera which particularly preferably has four polarization filters. By using four polarization filters, the polarization state of a light beam can be uniquely determined, so that a unique statement about the polarization state of the measured light beam can be made with only one ellipsometry measurement.

According to the invention, the assigned task can thus be achieved by carrying out different method steps, which are listed again here as a preferred variant. The steps are:

(a) continuously illuminating the object with light of at least 1 monochromatic wavelength, for example from an illumination arrangement or light source;

b) carrying out a relative movement between the combined ellipsometry/interferometry measuring system and the object, preferably continuously and without interruption;

c) splitting the light beam such that the portion of the illumination used for ellipsometry (ellipsometry light beam) impinges on the surface of the object at an angle and is linearly polarized;

d) directing the portion of the illumination used for interferometry (interferometry light beam) such that it impinges on the surface preferably at least nearly at a right angle;

e) recording, with the sensors of the ellipsometry measurement system, the signal intensity for at least 4 polarization directions of the light beam;

f) recording, with the sensors of the interferometry measuring system, the signal intensities modulated in their intensity by the surface profile;

g) determining the values for the effective refractive index and the effective absorption coefficient of the material combination just measured at each measurement point from the ellipsometry data;

h) correcting the intensities measured with the sensor of the interferometry measurement system using the determined effective refractive indices and extinction coefficients with respect to the influence of the just measured material combination at each measurement point; and i) calculating the profile height of the object from the corrected interference signal intensities.

In such an arrangement, line sensors are preferably used for the interferometry measurement. Thereby, a wide strip of the object can be measured continuously. Preferably, a main subject matter of the invention is the correction of the influence of the different surface materials of the object to be measured. For many of the possible applications, a height measuring range of half a wavelength of the light used is sufficient. For a larger working range, the simultaneous use of several wavelengths is possible. The basic configuration of this method is disclosed in patent application EP19188318. Details are explained in the exemplary embodiment.

From the intensity measurement of a signal modulated by interferometry, the distance to the measured object can be determined uniquely with very high resolution. However, this is only true if the surface of the measured object reflects the used light 100% or if the reflectance and a possible phase shift are known with appropriate accuracy. The invention is based on the knowledge that phase shifts of the reflected light occur as a result of interferences of the light components reflected at layer interfaces with each other and with the light reflected at the surface. Since the variations in the layer thicknesses and possibly also in the material are often of the same order of magnitude as the variation in the surface to be measured, nominal values for the layer system cannot be expected. Furthermore, for very thin layers, in addition to the uncertainty regarding the layer thicknesses, the optical material parameters are not sufficiently known. For layers whose thicknesses are below the exciton radii (for Si, e.g., about 20 nm), the parameters deviate significantly from the known volumetric values due to quantum confinement effects.

Within the scope of the invention it was recognized that determining the layer structure from the measurement signal itself (e.g. from details of the interferogram of a white light interferometer) is only possible to a very limited extent and only for very simple layer structures. The resulting inaccuracy is high. On the other hand, it was recognized that for a surface profile measurement, the layer structure is not of interest. Rather, it is sufficient to know or determine the effective influence of the layer stack or material as a whole on the interferometry.

The invention is also based on the knowledge that the absorption and reflection properties of any layer system can be uniquely combined to form an effective refractive index $n_{eff}$ and an effective extinction coefficient $k_{eff}$. With exact knowledge of the optical parameters, thus, the refractive index and the absorption coefficient, and the thicknesses of the layers in the system, the effective $n_{eff}$ refractive index and the effective extinction coefficient $k_{eff}$ can be determined uniquely using Fresnel's formulas and the transfer matrix formalism, which are well known from the literature. The two parameters $n_{eff}$ and $k_{eff}$ completely describe the reflection at the surface as long as the sample is composed of homogeneous material or the uppermost layer absorbs enough of the incident light that reflections at underlying interfaces have no noticeable influence on the measurement signal.

In the presence of at least partly transparent layers, an effective layer thickness $d_{eff}$ and a substrate described by the specific refractive index $n_{subst}$ and extinction coefficient $k_{subst}$ are additionally required for the description of an effective substitute system. It was recognized that this is necessary to represent the phase shift of the reflected light wave generated by the interference effects. Therefore, for a complete description of the light wave reflected from the sample to be examined, it is necessary and sufficient to assume a triple layer system (environment, effective layer and substrate) and to characterize it with the corresponding parameters $n_{eff}$, $k_{eff}$, $d_{eff}$, $n_{subst}$ and $k_{subst}$. For the environment, air is assumed in the following without loss of generality with n=1 and k=0.

For the profile measurement to be performed, the substrate material with its parameters $n_{subst}$ and $k_{subst}$ can be assumed to be known. Thus, the effective parameters $n_{eff}$, $k_{eff}$ and $d_{eff}$ for refractive index, extinction coefficient and substrate thickness must be determined in order to accurately correct the interferometry measurement values from the interferometry measurement without detailed knowledge of the layer system and to determine in this manner the sought true distance between the surface of the object to be measured and the sensor.

Preferably, one aspect of the invention is to determine the parameters $n_{eff}$, $k_{eff}$ and $d_{eff}$ by an additional measurement in addition to the recording of the interferometry signal. This can be solved in an advantageous manner by a parallel ellipsometry measurement. Ellipsometry measures the change in polarization of a light beam incident on the sample with a defined polarization state. For a homogeneous material, the use of the polarization ellipse is sufficient. The change in polarization is represented by the polarization ellipse (see FIG. 2). Position and shape of the ellipse are determined in the ellipsometry measurement and described by the values $\Psi$ and $\Delta$. The relationship to the complex reflection coefficient $\rho$ is then:

$$\rho = \tan(\Psi)e^{i\Delta} \quad (1)$$

The complex permittivity $\varepsilon$ can be calculated directly from $\rho$.

$$\varepsilon_r = \sin^2\phi_i * \left[1 + \tan^2\phi_i * \left(\frac{1-\rho}{1+\rho}\right)^2\right] \quad (2)$$

Here, $\phi_i$ denotes the angle of incidence of the light beam measured from the normal of the object surface (also referred to as the sample surface) at the measurement point. The relative permittivity is related to the refractive index n and the extinction coefficient k through the equation:

$$(n+ik)^2 = (\varepsilon'_r + i\varepsilon''_r)\mu_r \quad (3)$$

For non-magnetic materials ($\mu_r \sim 1$) for n and k, the relations are:

$$n^2 = \frac{1}{2} * \left(\sqrt{\varepsilon_r'^2 + \varepsilon_r''^2} + \varepsilon'_r\right) \quad (4)$$

$$k^2 = \frac{1}{2} * \left(\sqrt{\varepsilon_r'^2 + \varepsilon_r''^2} + \varepsilon'_r\right) \quad (5)$$

These basic relationships are principally known to the person skilled in the art and can be read in detail in a large number of textbooks (e.g. Hand-book of Ellipsometry, see Lit. (2)). The relations shown apply for each wavelength.

If one or more transparent layers have to be considered, as is generally necessary for semiconductor or other wafer applications in semiconductor manufacturing, the general approach is still not sufficient. Therefore, according to the invention, the described approach of an effective resulting layer (described by $n_{eff}$, $k_{eff}$ and $d_{eff}$) on a known substrate is used.

Furthermore, the knowledge about the used substrate (described by its parameter $n_{subst}$ and $k_{subst}$) is utilized. If these substrate parameters are not sufficiently known, they can preferably be determined with the device according to the invention in a preparatory measurement at a suitable location where the substrate is exposed (e.g. at the edge of the wafer or at the backside). Furthermore, also used according to the invention is the fact that the optical response of a system consisting of substrate and one or more material layers can be described as that of a 3-fold system (substrate, layer, environment) with the help of effective values for the complex refractive index and the layer thickness using the well-known transfer matrix formalism.

In the following mathematical representation of the correlations, the 3 layers and their parameters are designated with the indices 0, 1, 2 for the sake of shorter notation. That is, for the environment applies $n_0=1$, $k_0=0$; for the substitute layer: $n_1$, $k_1$, $d_1$ corresponds to the set $n_{eff}$, $k_{eff}$, $d_{eff}$ and for the substrate: $n_2$, $k_2$ stands for $n_{subst}$ and $k_{subst}$, respectively.

According to the invention, therefore, the monochromatic light used is divided into two portions, of which one portion (interferometry light beam) is used for the interferometry measurement and a second portion (ellipsometry light beam) is used for the ellipsometry measurement to be carried out in parallel. For the ellipsometry measurement to be carried out, a measurement with a fixed angle of incidence and fixed polarization direction of the incident light beam is sufficient. For the unique determination of the polarization state of the reflected light beam, preferably four light intensity measurands are required in each case for different polarization directions of the reflected light beam.

The method presented here is initially described only for a single detector element. It is understood that it is advantageous to operate with line detectors for both interferometry and ellipsometry in order to measure a multiplicity of measurement points simultaneously. For each line element, the 4 ellipsometry intensity measurements and the interferometry measurement are to be carried out separately and the quantities sought are to be determined. A possible implementation of the measuring device is exemplarily shown in FIG. 1 and explained further below.

In the following, the correction for the interferometry signals and subsequently the determination of the correction parameters from the ellipsometry is likewise shown only for a single detector element and for a wavelength $\lambda$ used for the measurement. In order to implement the profile measurement with high speed and precision, line scan cameras are advantageously used, which operate according to the TDI principle (Time-Delayed-Integration principle). Suitable TDI line scan cameras are preferably also used for ellipsometry measurements. The TDI line scan cameras have 4 TDI blocks, each with 4 different polarization filters for the incident light. Alternatively, appropriate area scan cameras can be used, which have a polarization filter set in front of the sensor instead of a Bayer color pattern filter. Likewise, it is possible-albeit with a considerable loss of speed—to carry out the measurement using cameras without filters or with a filter with only one polarization direction by changing the filters and carrying out the measurements one after the other.

A possible preferred extension is the use of multiple wavelengths. Such a preferred setup is advantageous for profile heights whose height range exceeds half a wavelength of the light used. Within the scope of the invention, it was also recognized that wavelengths is also advantageous for flatter profiles, since the number of ellipsometry measurements required to determine the effective material parameters of the substitute layer ($n_{eff}$ and $k_{eff}$) and the layer thickness $d_{eff}$ necessarily increases accordingly by multiples. For each additional light wavelength used, two new unknown material parameters to be determined are added (since $n_{eff}$ and $k_{eff}$ depend on the wavelength), but the effective layer thickness is the same for all wavelengths. Thus, the ratio of independent measurements to the number of unknown quantities improves and contributes accordingly to the robustness of the measurement.

In the following, the interferometry correction is explained in more detail, thus, the correction of the measurement values of the interferometry measurement with the parameters obtained from the ellipsometry measurement.

The reflection of the light used for interferometry at the object surface produces a change in the reflected amplitude which is described by the real reflection coefficient R, and a phase shift of the light wave, which is described by the phase offset $\varphi$. The phase shift occurs due to interference effects at the interfaces that lie below the surface. S arriving signal at the interferometry detector can be represented as:

$$S = q * R * \gamma * \left[1 + \cos\left(\frac{2\pi}{\lambda/2}(z_r - z_s) - \varphi\right)\right] \quad (6)$$

Here, q denotes the intensity of the light source, R the real reflection coefficient of the surface of the measurement object at the wavelength λ, γ a device constant resulting from detector sensitivity and the absorption and reflection losses at the optics, and $z_r$ and $z_s$ denote the distances between the beam divider (divider mirror) of the interferometer and the reference mirror (mirror at which the reference beam is reflected) or the surface of the measurement object.

Using the Substitutions:

$$\Delta z = z_r - z_s \quad (7)$$

the sought quantity Δz (the profile of the sample surface with respect to the fixed distance between the divider mirror and the reference mirror) can be represented as:

$$\Delta z = \frac{\lambda}{4\pi}\left(\varphi + \arccos\left(\frac{s}{qR\gamma} - 1\right)\right) \quad (8)$$

The quantities to be determined from the measurement are therefore, besides the measured signal intensity S, the real reflection coefficient R at the surface of the measurement object and the phase shift φ, if present.

The determination of the correction parameters from the ellipsometry measurement is explained in more detail below.

In order to be able to represent the reflection as real reflection amplitude R and phase shift φ for the solution of the so-called interference equation (8), a model layer system, for example according to FIG. 3, with a layer $L_1$ described by $n_1$, $k_1$ and thickness $d_1$ (=$n_{eff}$, $k_{eff}$, $d_{eff}$) on a known substrate $L_2$ ($n_2$, $k_2$ resp. $n_{subst}$, $k_{subst}$) is to be assumed. In this representation—without loss of generality—air is assumed for the environment ($n_0$=1 and $k_0$=0). Of course, other materials (for possible use of the immersion effect) such as water or oil with the corresponding parameters can also be used.

The phase factor β for the path difference of the wave, which has passed through the layer $L_1$ once, is given by $$\beta = 2\pi \frac{d_1}{\lambda} n_1^* \cos\Theta_1 \quad (9)$$

where $n_1^* = n_1 + i\, k_1$ is the complex refractive index of $L_1$.

The refraction angles at the two interfaces environment/layer $L_1$ and layer $L_1$/substrate can be calculated from the Snell's refraction law. With $$n^*_0 \sin\Theta_0 = n^*_1 \sin\Theta_1 = n^*_2 \sin\Theta_2 \quad (10)$$

the results is:

$$\cos\Theta_1 = \sqrt{1 - \frac{n_0^{*2}}{n_1^{*2}}(\sin\Theta_0)^2} \quad (11)$$

$$\cos\Theta_2 = \sqrt{1 - \frac{n_1^{*2}}{n_2^{*2}}(\sin\Theta_1)^2} = \sqrt{1 - \frac{n_0^{*2}}{n_2^{*2}}(\sin\Theta_0)^2} \quad (12)$$

For the phase factor, substitution into (9) results in $$\beta = 2\pi\frac{d_1}{\lambda}\sqrt{n_1^{*2} - n_0^{*2}(\sin\Theta_0)^2} \quad (13)$$

From the well-known Fresnel formulas, the following holds for the reflection at the first interface:

$$\rho_{01,s} = \frac{n_0^* \cos\Theta_0 - n_1^* \cos\Theta_1}{n_0^* \cos\Theta_0 + n_1^* \cos\Theta_1} \quad (14)$$

$$\rho_{12,s} = \frac{n_1^* \cos\Theta_1 - n_2^* \cos\Theta_2}{n_1^* \cos\Theta_1 + n_2^* \cos\Theta_2} \quad (15)$$

$$\rho_{01,p} = \frac{n_1^* \cos\Theta_0 - n_0^* \cos\Theta_1}{n_1^* \cos\Theta_0 + n_0^* \cos\Theta_1} \quad (16)$$

$$\rho_{12,p} = \frac{n_2^* \cos\Theta_1 - n_1^* \cos\Theta_2}{n_2^* \cos\Theta_1 + n_1^* \cos\Theta_2} \quad (17)$$

The indices s and p stand for the portion of the electric amplitude of the light wave whose polarization direction is in the plane of incidence (p=parallel) and perpendicular to the plane of incidence (s=perpendicular), respectively, as shown in FIG. 4 with the index designations π and σ. It is to be noted that all refractive indices denoted by * are generally complex. Therefore, the reflection coefficients for the amplitude of the light wave $\rho_{i,k}$ are generally complex quantities as well. To take into account the multiple reflection at the interfaces of the media 0/1 and 1/2, it is helpful that the reflected amplitudes form a geometric series whose limit value can be calculated directly.

Thus, for the total reflection at the sample surface (thus at the interface of the media 0/1, accordingly at the interface environment/substitute layer), it holds:

$$\rho_s = \frac{\rho_{01,s} + \rho_{12,s} e^{-i2\beta}}{1 + \rho_{01,s}\rho_{12,s} e^{-i2\beta}} \quad (18)$$

$$\rho_p = \frac{\rho_{01,p} + \rho_{12,p} e^{-i2\beta}}{1 + \rho_{01,p}\rho_{12,p} e^{-i2\beta}} \quad (19)$$

These field amplitude reflection coefficients can now be used directly to calculate the light intensity at the detector of a radiometric ellipsometer (see FIG. 4). The ellipsometer comprises a light source, a polarizer with angle $\alpha_1$, the sample (object) to be measured, an analyzer with angle $\alpha_2$, and a detector.

The resulting intensities at the detector can be represented by means of the Jones calculus. In the Jones calculus, the polarization state of the electric field is summarized in a vector and the temporal component of the wave propagation is suppressed. The electric field (without temporal component) after the polarizer is given by:

$$E_i^{ps} = \begin{bmatrix} E_{ip} \\ E_{is} \end{bmatrix} = \begin{bmatrix} E_i \cos(\alpha_1) \\ E_i \sin(\alpha_1) \end{bmatrix} \quad (20)$$

Here, $E_i$ is the electric field amplitude of the light source and $\alpha_1$ is the angle of the polarizer.

The reflection at the sample is described by the matrix:

$$T_s^{ps} = \begin{bmatrix} \rho_p & 0 \\ 0 & \rho_s \end{bmatrix} \quad (21)$$

with the two reflection coefficients calculated in Eqs. (18) and (19) for the parallel and perpendicular field components of the light wave reflected at the model system.

After rotation of the system into the coordinate system of the analyzer by means of the rotation matrix R, the effect of the analyzer assumed to be ideal can be described by the matrix $T_a$:

$$R(\alpha_2) = \begin{bmatrix} \cos(\alpha_2) & \sin(\alpha_2) \\ -\sin(\alpha_2) & \cos(\alpha_2) \end{bmatrix} \quad (22)$$

$$T_a = \begin{bmatrix} 1 & 0 \\ 0 & 0 \end{bmatrix} \quad (23)$$

The Jones vector at the detector then is $$E_d = T_a * R(\alpha_2) * T_s^{ps} * E_i^{ps} \quad (24)$$

$$E_d = \begin{bmatrix} 1 & 0 \\ 0 & 0 \end{bmatrix} * \begin{bmatrix} \cos(\alpha_2) & \sin(\alpha_2) \\ -\sin(\alpha_2) & \cos(\alpha_2) \end{bmatrix} * \begin{bmatrix} \rho_p & 0 \\ 0 & \rho_s \end{bmatrix} * \begin{bmatrix} E_i\cos(\alpha_1) \\ E_i\sin(\alpha_1) \end{bmatrix} \quad (25)$$

$$E_d = \begin{bmatrix} \cos(\alpha_2)\rho_p\cos(\alpha_1)E_i + \sin(\alpha_2)\rho_s\sin(\alpha_1)E_i \\ 0 \end{bmatrix} \quad (26)$$

From this, the light intensity at the detector becomes:

$$I_d = E_d^* * E_d \quad (27)$$

$$I_d = \begin{bmatrix} \cos(\alpha_2)\cos(\alpha_1)\rho_p E_i^* + \sin(\alpha_2)\sin(\alpha_1)\rho_s^* E_i^* & 0 \end{bmatrix} *$$
$$\begin{bmatrix} \cos(\alpha_2)\rho_p\cos(\alpha_1)E_i + \sin(\alpha_2)\rho_s\sin(\alpha_1)E_i \\ 0 \end{bmatrix}$$

$$I_d = \cos^2(\alpha_2) * \cos^2(\alpha_1)\rho_p^* E_i^* \rho_p E_i + \sin^2(\alpha_2) * \sin^2(\alpha_1)\rho_s^* E_i^* \rho_s E_i + \quad (28)$$
$$\cos(\alpha_2)\cos(\alpha_1)\sin(\alpha_2)\sin(\alpha_1)\left(\rho_p E_i \rho_s^* E_i^* + \rho_p^* E_i^* \rho_s E_i\right)$$

Applying this equation to the concrete ellipsometry case with $\alpha_1=45°$ and measuring the intensity for the 4 angles $\alpha_2=0, 45°, 90°$ and $-45°$, the results can be written as:

$$I_d = \cos^2(\alpha_2)\tfrac{1}{2}\rho_p^* E_i^* \rho_p E_i + \sin^2(\alpha_2)\tfrac{1}{2}\rho_s^* E_i^* \rho_s E_i + \cos(\alpha_2)\sin(\alpha_2)\tfrac{1}{2}(\rho_p E_i \rho_s^* E_i^* + \rho_p^* E_i^* \rho_s E_i) \quad (29)$$

$$I_{d,0} = \tfrac{1}{2}\rho_p^* E_i^* \rho_p E_i \quad (30)$$

$$I_{d,45} = \tfrac{1}{4}E_i E_i^* (\rho_p^*\rho_p + \rho_s^*\rho_s + \rho_p\rho_s^* + \rho_p^*\rho_s) \quad (31)$$

$$I_{d,90} = \tfrac{1}{2}\rho_s^* E_i^* \rho_s E_i \quad (32)$$

$$I_{d,-45} = \tfrac{1}{4}E_i E_i^* (\rho_p^*\rho_p + \rho_s^*\rho_s - \rho_p\rho_s^* - \rho_p^*\rho_s) \quad (33)$$

The selection of angles $\alpha_1$ and $\alpha_2$ is for simplicity of illustration and calculation only. Within the meaning of the invention, suitable other 5 angles can also be selected which will allow the polarization state of the light wave at the detector to be fully determined.

The product $E_i^* E_i$ in (30) to (33) is the input intensity of the light source at the device, which corresponds to the output intensity at the light source, and may be abbreviated $I_0$. The input intensity can be measured in the device according to the invention by a preparatory measurement using an ideal mirror or a known material as a sample. Advantageously, it is additionally monitored during the measurement of the unknown sample (object) to be examined by means of a monitor measurement on the light source itself. Suitable for this purpose is, e.g., the monitor diode at a laser used as light source. This leads to 4 equations for the reflection coefficients:

$$\rho_p^*\rho_p = 2I_{d,0}/I_0 \quad (34)$$

$$\rho_p\rho_s^* + \rho_p^*\rho_s = 2\frac{2I_{d,45} - I_{d,0} - I_{d,90}}{I_0} \quad (35)$$

$$\rho_s^*\rho_s = 2I_{d,90}/I_0 \quad (36)$$

$$\rho_p\rho_s^* + \rho_p^*\rho_s = 2\frac{I_{d,0} + I_{d,90} - 2I_{d,-45}}{I_0} \quad (37)$$

The redundant fourth measurement can be used to improve stability:

$$I_{d,0} + I_{d,90} = I_{d,45} + I_{d,-45} \quad (38)$$

It is therefore possible to determine from the 4 measured values (3 independent intensity values and one redundant value) the 3 unknown quantities $n_{eff}$, $k_{eff}$, $d^{eff}$, from which the complex reflection coefficients $\rho_{i,k}$ can be calculated. The input intensity is determined by a reference measurement and at the same time by monitoring the light source.

The same Jones calculus can be used for the interferometry light beam to describe the wave reflected from the sample. Here, the polarizer and analyzer components are omitted. Furthermore, the parallel polarized component can be neglected, since the main beam intensity falls perpendicularly onto the sample.

Thus, for the returning wave, this results in:

$$E_{dIF} = \begin{bmatrix} \rho_s E_{iIF} \\ 0 \end{bmatrix} \quad (39)$$

The index "IF" stands here for the reference to the interferometry light beam. The index denotes again the light wave at the detector and the index i the input light wave. The quantities R and φ sought for the interferometry equation (8) can be determined from:

$$R = \rho_s \rho_s^* * I_{0IF} \quad (40)$$

$$\varphi = \arctan\left(\frac{Im(\rho_s)}{Re(\rho_s)}\right) \quad (41)$$

Perpendicular light incidence and air as the ambient medium results in:

$$\rho_{01,sIF} = \frac{1 - n_1^*}{1 + n_1^*} = \quad (42)$$
$$\frac{1 - n_1 - ik_1}{1 + n_1 + ik_1} = \frac{(1 - n_1 - ik_1)*(1 + n_1 - ik_1)}{(n_1 + 1)^2 + k_1^2} = \frac{1 + n_1^2 - k_1^2 - i2k_1}{(n_1 + 1)^2 + k_1^2}$$

$$\rho_{12,sIF} = \frac{n_1^* - n_2^*}{n_1^* + n_2^*} = \quad (43)$$
$$\frac{n_1 - n_2 + i(k_1 - k_2)}{n_1 + n_2 + i(k_1 + k_2)} = \frac{(n_1 - n_2 + i(k_1 - k_2))*(n_1 + n_2 - i(k_1 + k_2))}{(n_1 + n_2)^2 + (k_1 + k_2)^2} =$$

-continued $$\frac{n_1^2 - n_2^2 + k_1^2 - k_2^2 + i2(k_1 n_2 - k_2 n_1)}{(n_1 + n_2)^2 + (k_1 + k_2)^2}$$

$$\rho_s = \frac{\rho_{01,s} + \rho_{12,s} e^{-i2\beta}}{1 + \rho_{01,s} \rho_{12,s} e^{-i2\beta}} = \quad (44)$$

$$\frac{\frac{1 + n_1^2 - k_1^2 - i2k_1}{(n_1 + 1)^2 + k_1^2} + \frac{n_1^2 - n_2^2 + k_1^2 - k_2^2 + i2(k_1 n_2 - k_2 n_1)}{(n_1 + n_2)^2 + (k_1 + k_2)^2} e^{-i2\beta}}{1 + \frac{1 + n_1^2 - k_1^2 - i2k_1}{(n_1 + 1)^2 + k_1^2} * \frac{n_1^2 - n_2^2 + k_1^2 - k_2^2 + i2(k_1 n_2 - k_2 n_1)}{(n_1 + n_2)^2 + (k_1 + k_2)^2} e^{-i2\beta}}$$

With this equation and (40) and (41), R and φ are represented by $n_1$, $k_1$ and $d_1$. If these three parameters of the effective substitute layer are determined from the measurements of the 4 ellipsometry values according to the equations (34) to (37), then R and φ can be calculated. After substitution in (8), the distance difference between the reference reflector (reference mirror) and the sample surface in each case to the divider mirror (beam divider) can thus be calculated, taking into account the correction for the material-dependent reflection at the sample (object). This results in the sought height profile of the surface.

When using only one wavelength for the interferometry measurement and the solution according to the invention presented so far, the working range regarding distance of the measurement remains limited to half a wavelength of the light used. Outside this range, the relationship between intensity and distance becomes ambiguous, since from the signal intensity alone it is not possible to determine directly how many periods the path difference between the reference beam and the object beam covers. Conventional interferometers solve this by determining a reference distance during initialization and subsequently by continuously counting the measured intensity periods. However, this is not suitable for the use according to the invention of a line-type interferometer since a reference would have to be available which is parallel to the interferometer line array over better than half a wavelength, and there should be no steps on the measurement object of more than half a wavelength in height. However, at least the latter is not the case, e.g., for the measurement of contact structures on wafers.

If, on the other hand, two or more different wavelengths are used, the working range within which the measurement can be carried out uniquely without a start reference and without period counting can be extended. The different wavelengths have different periodicities. Thus, from the combination of the signals of the used wavelengths in a wider range, a unique measurement can take place. Basics of such a method are presented, e.g., in "Multi-Wavelength Interferometry for Length Measurements Using Diode Lasers" by K. Meiners-Hagen et al.

The directly detectable working range A for two wavelengths $\lambda_1$ and $\lambda_2$ is therefore:

$$A = \Lambda/2 = \frac{1}{2} * \frac{\lambda_1 * \lambda_2}{\lambda_2 - \lambda_1} \quad (45)$$

If not only the total intensity curve of the synthesized wavelength λ is considered, but the two wavelengths $\lambda_1$ and $\lambda_2$ are each considered separately, the working range A can be extended to a multiple of the wavelengths $\lambda_1$ and $\lambda_2$ (method of exact phase fractions). The method described in the above-mentioned publication can be combined with the present invention by combining several wavelengths before they enter the arrangement. The set of parameters $n_{eff}$, $k_{eff}$ and $d_{eff}$ then becomes $n_{eff,i}$, $k_{eff,i}$ and $d_{eff,i}$, wherein the index i references the wavelengths used, since refractive index and absorption are different for each wavelength and therefore must be determined for all wavelengths used.

Thus, one aspect of the invention considers the simultaneous measurement of interferometry signals and ellipsometry signals, as well as the observation of the influence of the sample material (material of the object) and the layered structure in an effective 3-layer system comprising the environment, the effective layer, and the substrate.

BRIEF DESCRIPTION OF THE DRAWINGS

The invention is described and explained in more detail below with reference to some selected exemplary embodiments in connection with the accompanying drawings. In the figures.

DETAILED DESCRIPTION OF EMBODIMENTS

Figure 5:
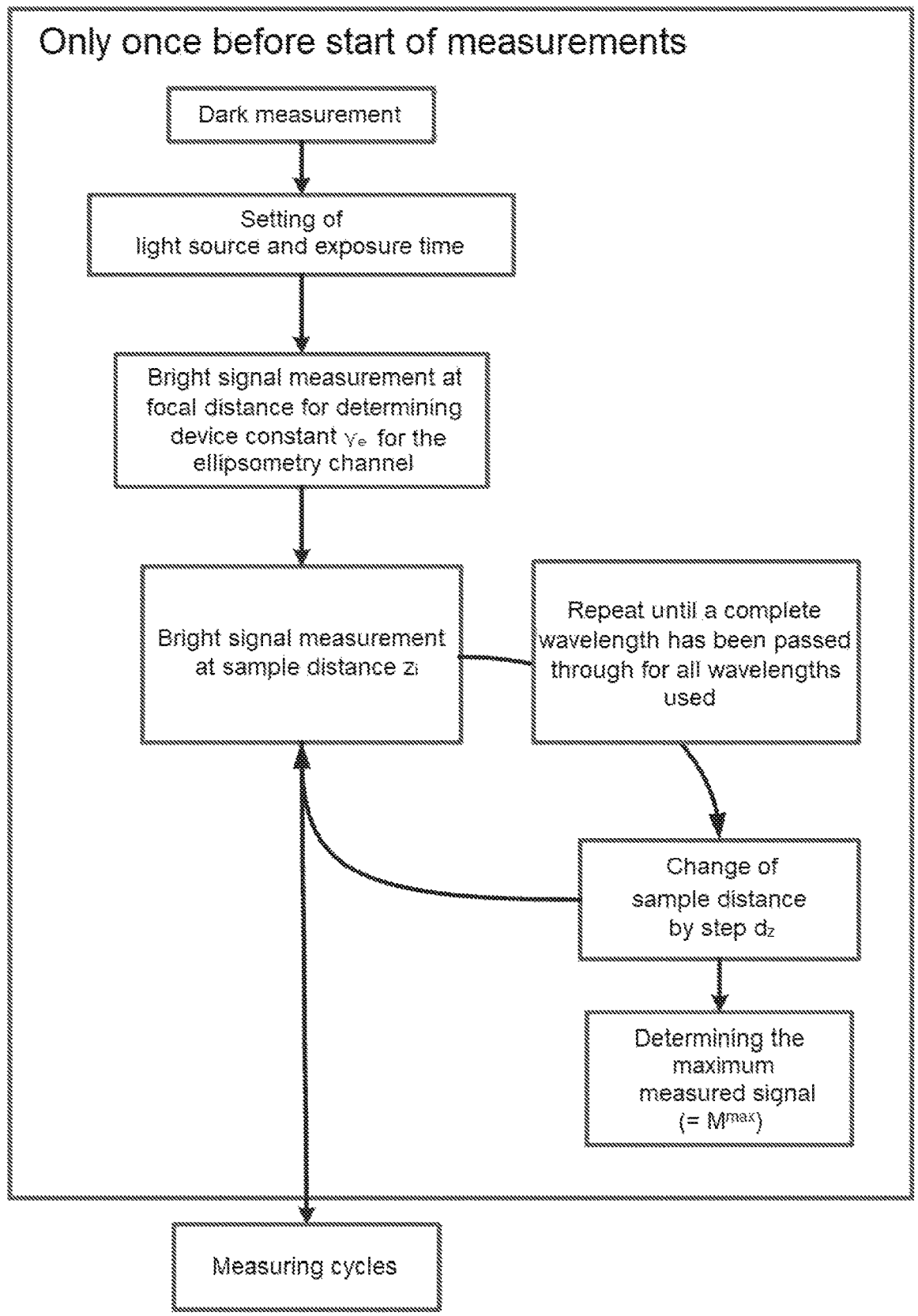
FIG. 5 shows an illustration of the method steps for preparing an interferometry measuring system for interferometric distance measurement.
Figure 6:
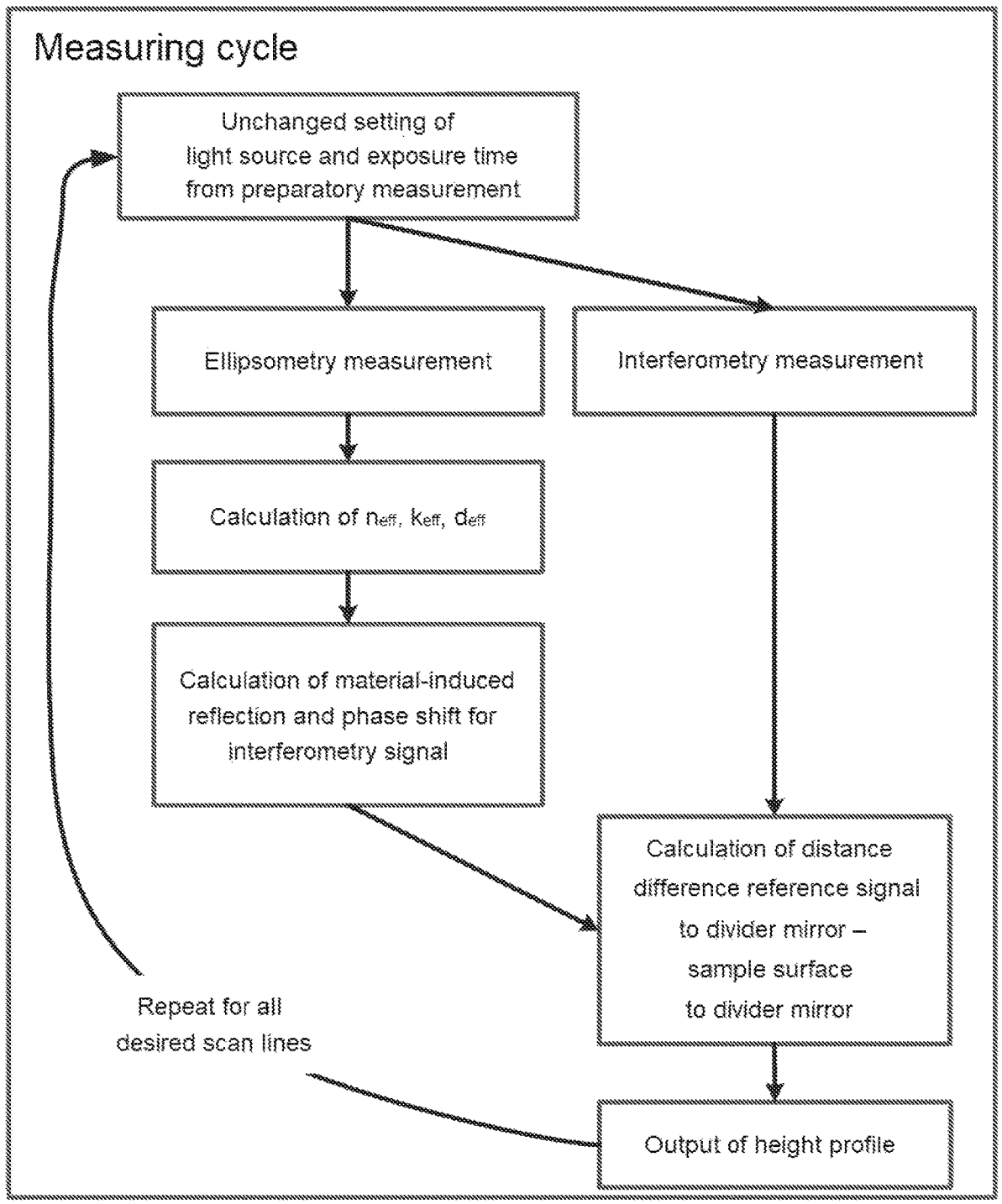
FIG. 6 shows an illustration of the method steps for carrying out an interferometric distance measurement by means of the interferometry measuring system.

First, the measurement setup and beam path of a system according to the invention are described with reference to FIGS. 1 to 4 and 7 before the procedure for preparing a measurement with a preferred embodiment of the invention and the procedure for carrying out a measurement in FIGS. 5 and 6 are discussed.

Figure 1:
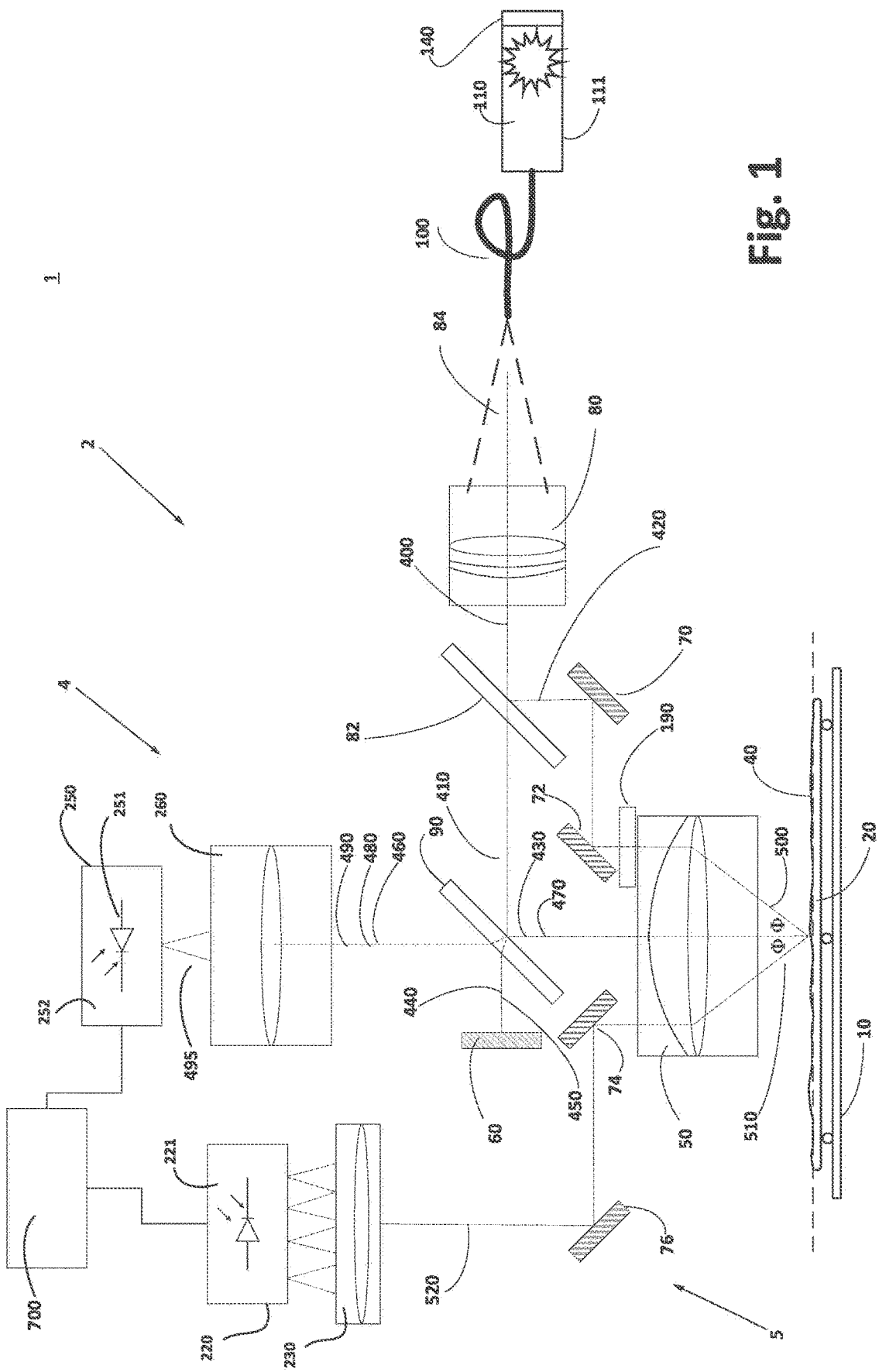
FIG. 1 shows a schematic illustration of a system according to the invention for interferometric distance measurement with simultaneous recording of ellipsometry data.
Figure 2:
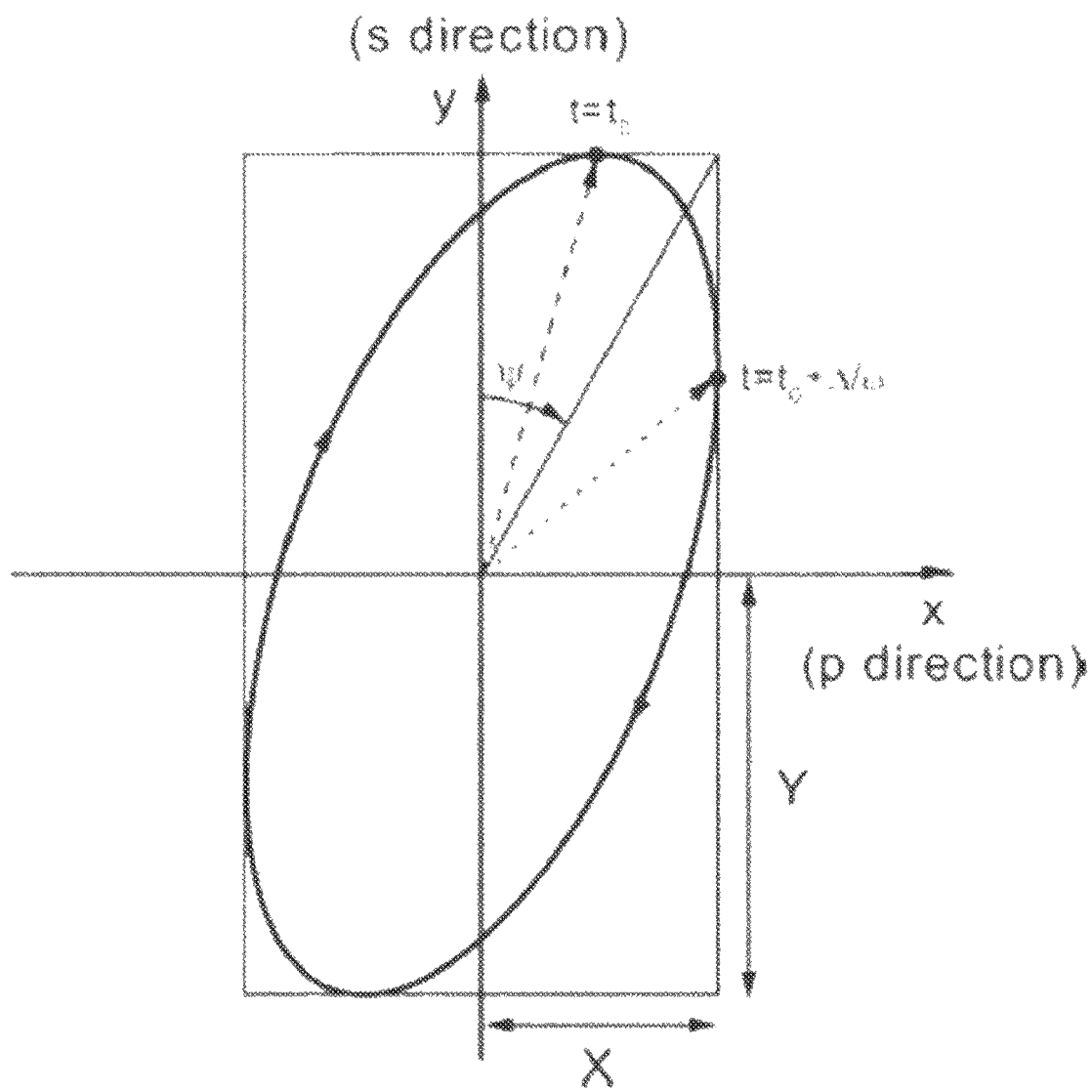
FIG. 2 shows a schematic illustration of the polarization conditions of a light wave with the aid of the polarization ellipse.
Figure 3:
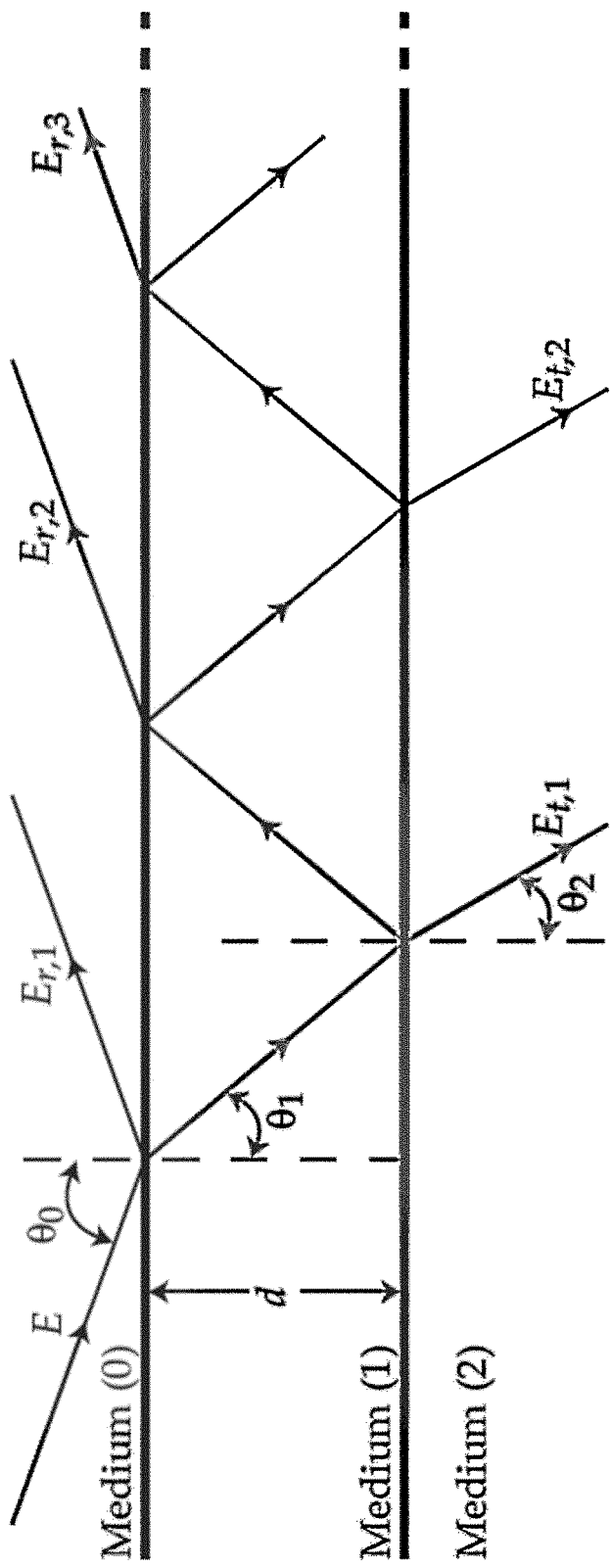
FIG. 3 shows a schematic illustration of the light reflection at a 3-layer system consisting of environment/transparent layer/substrate.
Figure 4:
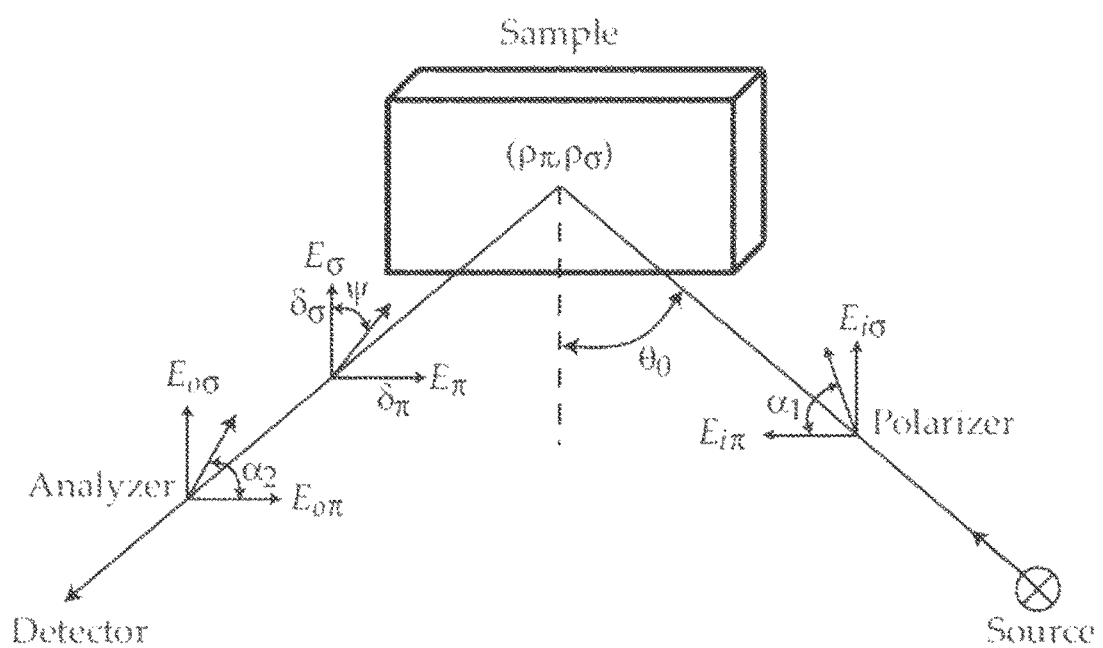
FIG. 4 shows a schematic diagram of a radiometric ellipsometry measuring system with fixed polarizer, sample and analyzer.
Figure 7:
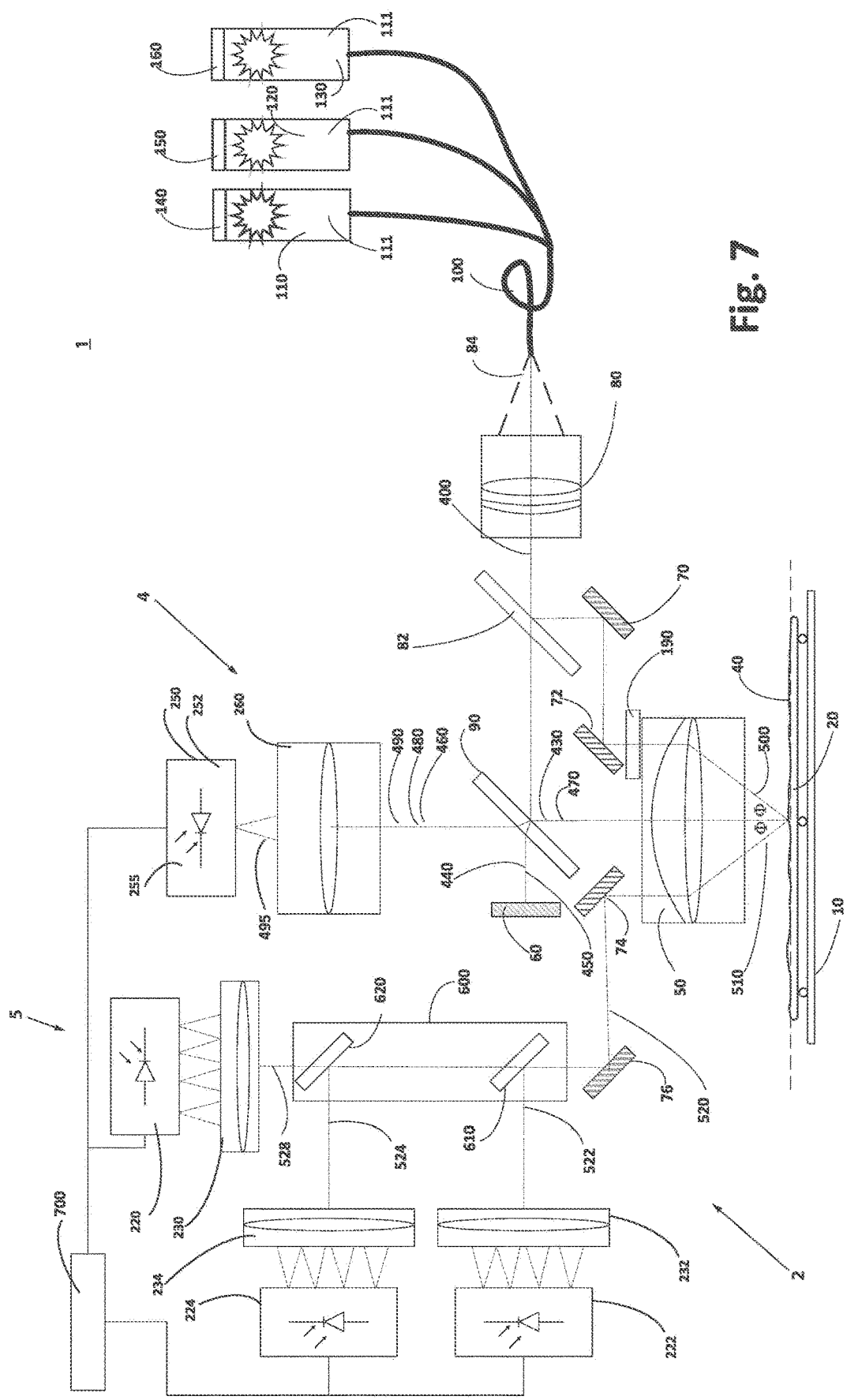
FIG. 7 shows a schematic illustration of a system according to the invention for interferometric distance measurement with simultaneous recording of ellipsometry data using 3 light wavelengths.

FIGS. 1 and 7 show two different embodiments of a system 1 according to the invention for measuring the profile of an object surface 40 of a flat object 20 comprising unknown materials. The system 1 comprises an optical device 2 for measuring the profile of the object surface 20, a light source 111 for generating a monochromatic light beam, and a movement unit 10 for moving the object 20 relative to the device 2. While the embodiment of the system 1 according to FIG. 1 comprises only one light source 111, the system 1 according to FIG. 7 comprises three light sources 111. Accordingly, the devices 2 of the respective embodiments differ.

In both embodiments, the device 2 comprises an interferometry measuring system 4 with a beam divider 91, a reference mirror 60 and a detector unit 250 for receiving and analyzing an analysis beam 490. The ellipsometry measuring system 5 comprises a polarizer 190 and an ellipsometry sensor 220 for analyzing the polarization state of a received sensor beam 520. An analysis unit determines the profile heights of the object surface 40 of the object 20, e.g., a wafer, from the results of the measurements with the interferometry measuring system 4 and the ellipsometry measuring system 5. In doing so, the measurement results of the interferometry measurement are corrected with the correction parameters of the ellipsometry reliable measurement values that take into account different and locally different materials of the object surface.

Wafers or other flat objects 20 are moved sequentially relative to the system 1 according to the invention and a camera of the system 1. In the present exemplary embodiment, the camera is stationary and the objects 20 are passed through below the camera by means of the movement unit 10. In another exemplary embodiment, preferably the camera is moved. In an alternative exemplary embodiment, preferably the relative movement is divided between the camera and the object 20 such that, for example, the camera performs the movement in an axial direction while the object 20 can be moved in the direction perpendicular thereto. The movement between the camera and the object 20 is preferably continuous.

The exemplary embodiment in FIG. 1 uses a laser diode 110 as light source 111, a TDI line scan camera 251 (TDI=time delayed integration) as detector unit 250 for the interferometry signal (here analysis beam 490) and a TDI multi-channel line scan camera 221 with integrated polarization filters (not shown) as ellipsometry sensor 220 for a sensor beam 520 formed as an ellipsometry signal. However, a different number of light sources 111 can also be used. Likewise, a broader-band light source 111 can alternatively be used in combination with narrow band filters. Also, instead of TDI sensors, simple (multi-channel) line scan sensors (without TDI method) or area scan cameras or a set of multiple line scan cameras can be used.

In the exemplary embodiment in FIG. 1, the light from the laser diode 110 is supplied to the measurement arrangement (device 2) through a fiber coupler 100. The light emerges from the fiber coupler 100 as a light beam 84. The transmission via fiber optics serves only to decouple the laser 110 from the actual recording system, thus, the device 2. Instead of transmission via fiber optics, the (laser) light beams 84 can also be directed directly into the recording unit (device 2) via suitable optics, which reduces losses but requires a higher adjustment effort.

Beam shaping optics 80 are used to shape the light beam 84 into a parallel light bundle (light beam 400) having a cross-section adapted to the receiving surface. The light beam 400 (light bundle) is split into the two sub-bundles, namely an interferometry light beam 410 and an ellipsometry light beam 420, by a beam splitter 82 which is designed as a 50% partly transparent mirror. The split need not be 50/50. It can also be in other proportions and can be adjusted according to the sensitivity requirements of the beam paths and sensors.

The interferometry light beam 410 is directed by a beam divider 91, which is designed as a 50% partly transparent mirror 90, partly as a sub-bundle via a lens 50 onto the object surface 40 to be measured. This sub-bundle is the measuring beam 430. The other 50% of the interferometry light beam 410 passes through the partly transparent mirror 90 as reference beam 440. The reference beam 440 then impinges on a reference mirror 60 where it is reflected. The resulting returning sub-bundle (mirror beam 450) is again reflected by 50% at the partly transparent mirror 90 and travels as sub-bundle 460 to an interferometry detector 252, namely to the detector unit 250.

The measuring beam 430 directed onto the object surface 40 of the wafer is focused onto the imaging area by the lens 50. Due to the reflection at the object surface 40, the measuring beam 430 is reflected back through the lens 50 as the object beam 470. Half of the light from object beam 470 passes through the partly transparent mirror 90 and continues to travel as bundle 480 to interferometry detector 252. The light from both beams 460 and 480 interferes with each other to form analysis beam 490. The analysis beam 490 is now modulated in intensity by the interference of the light waves, corresponding to the difference in distance between partly transparent mirror 90 and reference mirror 60 on the one hand and partly transparent mirror 90 and object surface 40 on the other. The analysis beam 490 is focused by tube optics 260 as a bundle 495 onto the TDI line scan camera 251. The detector unit 250 thus picks up the distance-modulated interferometry signal.

The ellipsometry light beam 420 is directed here through two 100% mirrors 70 and 72, through the polarizer 190, which is adjustable in its angular position, as a bundle 500 and through the objective 50 onto the object surface 40 at an average angle of incidence $\Phi$. The light bundle 510 reflected from the surface 40 passes through the lens 50 and via the mirrors 74 and 76 as a sensor beam 520 to the tube optics 230 and is focused by the latter onto the 4-channel ellipsometry sensor 220. In the present example, the ellipsometry sensor 220 is a 4-channel TDI line sensor that has a polarization filter mounted in front of each of the 4 TDI blocks. The polarization filters are suitably oriented such that the polarization state of the incoming light (sensor beam 520) can be fully analyzed (for example, at angles 0°, 45°, 90°, and −45°). Thus, in each of the 4 detector elements forming a column of the ellipsometry sensor 220, four ellipsometry signals can be recorded such that the polarization state of the incoming light in this column can be fully determined from these four signals.

To monitor the intensity of light source 111, the monitor diode 140 is used to continuously monitor and measure the laser output power.

FIG. 7 shows an alternative arrangement according to the present invention, in which three wavelengths are used to improve the robustness of the measurement and/or to extend the unique working range. The three wavelengths are generated by lasers 110, 120 and 130 (laser diode) and their intensity is monitored by means of monitor diodes 140, 150 and 160. By means of a preferably spliced fiber coupler 100, the light beams of the individual laser diodes are combined and preferably bundled into a light beam 84. Deviating from the arrangement in FIG. 1, a multi-color TDI line scan camera 255 is used here in FIG. 7 for the interferometry measurement in order to record the signals separately for the three wavelengths. Another deviation is that the ellipsometry signals are separated for measurement by means of a separating element 600. Preferably, the ellipsometry signals are separated into the three wavelength components by means of two dichroic mirrors 610 and 620 and passed through the tube optics 232, 234 and 230 as beams 522, 524 and 528 and finally measured by means of the ellipsometry sensors 220, 222 and 224.

This representation is a principal arrangement which can, of course, be arranged in many ways. For example, the order of beam splitting (610, 620) into the wavelength components and focusing by means of tube optics (232, 234 and 230) can be reversed.

With reference to FIGS. 5 and 6, a preferred embodiment of the method according to the invention is described, which preferably first comprises some preparatory steps. According to the invention, the following preparatory steps are provided for preparing the measurement (see FIG. 5):

1) Measuring the dark signal with the light source 111 switched off to determine the dark signal of the detectors;
2) Setting the light source 111 to a predetermined working brightness;
3) Measuring the reflection at a 100% mirror as a sample to determine the device constant Y in Eq. (8);
4) Measuring the reflection at a 100% mirror or at a known homogeneous material as a sample for determining the device constant Ye for the ellipsometry measuring system 5.

To carry out the actual measurement, preferably by means of the system 1 according to the invention, the following steps per measurement point are provided according to the invention.

1) Simultaneously measuring the interferometry signal, the monitor signal and the ellipsometry signals at the desired measurement point of the object surface, thus receiving and analyzing the analysis beam 490 and the sensor beam 520;
2) calculating $\rho_s$ and $\rho_p$ from the 4 measured intensity values of the ellipsometry channel and the monitor value for the light source 111;
3) calculating effective parameters $n_{\textit{eff}}$, $k_{\textit{eff}}$ and $d_{\textit{eff}}$ from $\rho_s$ and $\rho_p$ using the angle of incidence $\theta_0$ of the ellipsometry channel and the given parameters $n_{subst}$, $k_{subst}$ of the substrate of the object 20;
4) calculating $\rho_s$ for the perpendicular incidence of light of the interferometry channel from $n_{\textit{eff}}$, $k_{\textit{eff}}$ and $d_{\textit{eff}}$;
5) calculating R and $\varphi$ from $\rho_s$ for perpendicular incidence of light;
6) calculating the distance difference $\Delta z$ between each of the reference reflector and the sample surface to beam divider 91 (divider mirror);
7) calculating the profile height at the measurement point (with respect to the distance of the reference mirror).

Following the measurement with the device 2 and the interferometry measuring system 4 and ellipsometry measuring system 5 comprised therein, the signal analysis is carried out in the analysis unit 700.

The following explanation of the calculation of the surface profile is carried out with only one wavelength to simplify the representation. If multiple wavelengths are used, the equations apply separately for each wavelength in an analogous manner. Likewise, the representation is carried out only for one pixel set at a time, i.e., for one line position of the line scan cameras used advantageously. The equations apply in an analogous manner for each pixel set at the respective line position. A pixel set here denotes the pixels belonging to the same line position in the interferometry camera and in the ellipsometry camera.

It is therefore possible to determine a multiplicity of height points of the profile simultaneously, depending on the sensor size and arrangement. For a line scan camera with 16384 points per line available today, this means 16384 height values for each readout clock of the cameras. Furthermore, with the device and system 1 described here, the line scan cameras can be moved continuously relative to the wafer (object). In accordance with the clock speed of the cameras, a corresponding number of lines with height information per unit time is obtained. Thus, at a clock rate of the proposed multi-channel TDI line scan cameras 221 of, for example, 100 kHz, more than 1600 million height values per second are obtained. Such cameras are offered by different manufacturers (e.g. by Vieworks and by Dalsa Teledyne). The use of such TDI multi-channel line scan cameras is a particularly suitable variant, since very high measurement speeds can be achieved. These cameras contain multiple (usually 4) TDI blocks in one camera, which can be operated and read out simultaneously. When using such cameras, the recording of the used wavelengths, which belong to one line on the wafer surface, is done successively. This means, while the first TDI block records the line area at $\lambda_1$, the second TDI block determines the signal at $\lambda_2$ and the third TDI block the signal $\lambda_3$. For the following calculation, this time offset is in principle irrelevant. It is only necessary to assign and analyze the signal images obtained in a chronologically staggered manner (corresponding to the spatial offset of the TDI blocks). This arrangement is particularly suitable for combining high signal quality (high-resolution and robust measurement) with high speed. Alternative arrangements are explained below.

The measurement procedure and its preparation are illustrated in FIGS. 5 and 6. For a correct determination of the height values, the measurement must be prepared by means of a dark signal measurement and a determination of the transfer function of the optics and the sensor system.

In the dark signal measurement, the signal d is measured at each camera pixel y of the two camera lines (ellipsometry sensor 220 and detector unit 250) with the light source switched off. This determines the so-called dark noise of the camera, which is an offset for each further measurement and is subtracted from the signal. This is done for both sensor arrays 220 (index z=1 to 4) and 250 (index z=5).

$d_{yz}$=read out dark value of signal at pixel $y$ of sensor $z$

To determine the optical and electrical transfer function of the arrangement, a bright signal measurement h is performed with a 100% mirror. For this purpose, the wafer surface or object surface 40 is replaced by a plane mirror with known reflection properties. Since the signal h at each sensor pixel is uniquely determined by the intensity of the light source 111 (signal value q), the transfer function M, the reflectance of the mirror R, the path difference $I_z$ of the two interfering light beams 460 and 480 (impinging on detector unit 250=sensor, z=5) and the dark signal d, the transfer function M can be determined for each pixel y in each of the sensor lines z if the values h, q, r, and d are known.

For the interferometry sensor, thus, the detector unit 250 (z=5), this is a function of the path difference $I_z$. For the ellipsometry sensors 220 (z=1 to 4), M is independent of the sample height as long as it is within the focal range. The transfer function is generally different for each pixel y and each sensor z. It is determined by the sensitivity of each pixel, by illumination, material properties, coatings, and aberrations of the optics.

In order to check the output intensity of the laser light source 111 and to include it in the calculation as a correction or reference value, the signal q of the monitor diode 140 (on the side of the laser facing away from the output) usually installed in each laser module 110 is used directly.

The signal h of the brightness reference measurement for the interferometry sensor (detector unit 250) is:

$$h_{yz,href}(l_z) = q_{href} * M_{yz}(l_z) * R_{href} + d_{yz} \quad (46)$$

Wherein:

$h_{yz,href}(l_z)$=measurement value of reference measurement at pixel y of sensor z (interferometry sensor 250 [z=5], ellipsometry sensor 220 [=1 ... 4]) as function of path difference $l_z$ $q_{href}$=light intensity of laser source during reference measurement $M_{yz}(l_z)$=transfer function at pixel y of sensor z as function of path difference $l_z$ $R_{href}$=reflectance of mirror in reference measurement (known material)

Here, the argument $I_z$ denotes the path difference the two interfering bundles 460 and 480 (impinging on sensor 250, z=5) have to each other. The reflectance R can be taken as a real value since for the reference measurement, advantageously, a mirror is chosen which does not generate a phase shift due to layer references.

If, for example, a mirror with a protective coating is to be used to improve long-term stability, the phase offset generated by the protective coating has no effect since the reference measurement is only used to determine the maximum of the transfer function.

The following holds true for the ellipsometry sensor 220:

$$h_{yz,href} = q_{href} * M_{yz} * R_{href} + d_{yz} \quad (47)$$

For the ellipsometry channel, it should be noted that a phase offset at the mirror, e.g. due to a possible protective coating, must be taken into account mathematically in the determination of the transfer function.

To determine the distance of the wafer surface from the sensor arrangement $z_{sample}$, the transfer function M (I) is split into a non-interfering factor $M^{max}$ and the interference effect. $M^{max}$ The factor is obtained by determining the maximum for each transfer function M (I). The intensity modulation due to the interference can then be determined directly from the values of the measurement sequence.

The following transfer function holds true for the sensor of the detector unit 250:

$$M_{yz}(l_z) = M_{yz}^{max} * \left(1 + \cos\left[\frac{2\pi}{\lambda/2} * (z_{mirror} - z_{sample})\right]\right) \quad (48)$$

And for the ellipsometry sensor 220, $M_{yz}$ is constant within the focus range.

Wherein:

$M_{yz}(l_z)$=transfer function at pixel y of sensor z as a function of the path difference $l_z$ $M_{yz}^{max}$=maximum value of the transfer function at pixel y of sensor z $z_{mirror}$=distance divider mirror–reference mirror of the interferometer $z_{sample}$=distance divider mirror–wafer surface This results in the following for the interferometry sensor (detector unit 250):

$$M_{yz}^{max} = \frac{h_{yz,href}(l_{z\,für\,h_{max}}) - d_{yz}}{q_{href} * R_{href}} \quad (49)$$

Wherein:

$l_z$ for $h_{max}$=path difference, for which the signal at sensor z is a maximum=$l_z$ is an integer multiple of the wavelength $\lambda$ $M_{max}$ is determined by continuously changing the distance $z_{sample}$ of the mirror used for the measurement and thus passing through a full wavelength period while recording the signal and determining the maximum.

In the measurement cycle with the unknown wafer surface (object surface 40) to be examined, the sensor signals $i_{y1}$ to $i_{y4}$ of the ellipsometry camera sensors 220 [z=1 ... 4] and $i_{y5}$ of the interferometry sensor (detector unit 250) [z=5] are now recorded simultaneously and the output intensities q of the laser light source 111 are measured by means of the installed monitor diode 140.

The following holds true for the signals at the sensor blocks in the camera (ellipsometry sensor 220):

$$i_{yz} = q * M_{yz} * r_{yz,wafer} + d_{yz} \quad (50)$$

Wherein:

$i_{yz}$=measurement value ellipsometry/interferometry at pixel y of sensor z q=irradiated light intensity $M_{yz}$=transfer function at pixel y of sensor z $r_{yz,wafer}$=reflection coefficient of the wafer at the location of pixel y at polarization angle z $d_{yz}$=read out dark signal value at pixel y of sensor z According to equations (30) to (33), the reflection coefficients $r_{y,wafer}$ result here from the material properties of the sample and at the correspondingly selected polarization angles. The quantities $n_{1,y}=n_{eff,y}$, $k_{1,y}=k_{eff,y}$ and $d_{1,y}=d_{eff,\,y}$ describing the sample material are now calculated from these measurements with the aid of equations (34) to (37) and (13) to (19), wherein the intensity values $I_{d,z}=I_{d,polarization\,angle}$ transformed with $q=I_0$ are substituted into the system of equations (34) to (37):

$$I_{d,z}/I_0 = \frac{i_{yz} - d_{yz}}{M_{yz}} \quad (51)$$

The material values determined in this way can now be used according to equation (43) to determine $\rho_{s,y5}$, the complex reflection coefficient for perpendicular light incidence at the location of pixel y of the interferometry sensor [z=5]. Finally, according to equations (40) and (41), the (real) reflectance $R_y$ and the phase offset $\varphi_y$ can be determined from $\rho_{s,y5}$ for each pixel location y. The following thus holds true for the intensities measured at the detector unit 250:

$$i_{y5} = q * R_y * M_{y5}^{max} * \left[1 + \cos\left(\frac{2\pi}{\lambda/2}(z_{mirror,y} - z_{sample,y}) - \varphi_y\right)\right] + d_{y5} \quad (52)$$

From this, finally, the sought quantity $\Delta z_y = z_{mirror,y} - z_{sample,y}$=the difference of the distance of the sample surface 40 to the distance of the reference mirror 60 from the (divider) mirror 90 can be calculated:

$$\Delta z_y = \varphi_y + \frac{\lambda/2}{2\pi} \arccos\left[\frac{i_{y5} - d_{y5}}{q * R_y * M_{y5}^{max}} - 1\right] \quad (53)$$

If, as shown in FIG. 7, multiple, e.g., preferably three wavelengths are used to increase the measurement region and/or improve the robustness of the measurement, the calculation shown up to this point must be performed separately for each wavelength. The distance difference values $\Delta z_{xy}$ are first determined in units of the respective half wavelength $\lambda_x$ from Eq. (51), where x is the index of the wavelengths. They can then be represented according to the so-called method of exact phase fractions in each case as the sum of integer fractions $\delta_x$ and the fractional remainder $f_x$:

$$\Delta z_{yx} = \frac{\lambda_x}{2} *(\delta_x + f_x) = \varphi_{xy} + \frac{\lambda_x/2}{2\pi} \arccos\left[\frac{i_{xy5} - d_{xy5}}{q_x * R_{xy} * M_{xy5}^{max}} - 1\right] \quad (54)$$

The sought distance difference $\Delta z_y$ is determined from the $\Delta z_{yx}$ by determining the triple $\delta_x$ of integer fractions for which the mean deviation of the associated $\Delta z_{yx}$ from the respective mean value is minimal and then calculating the mean value for the 3 remaining fractional fractions.

By suitable selection of the wavelengths $\lambda_1$, $\lambda_2$ and $\lambda_3$ for x=1, 2, 3, a working range of 0.5 mm with unique assignment of the intensity measurement value triples $i_{xy5}$ to the distance difference $\Delta z_y$ can be established without difficulty, which is sufficient for a multiplicity of profile measurement tasks. This is explained in detail in the aforementioned publication by K. Meiners-Hagen, R. Schrödel, F. Pollinger and A. Abou-Zeid. In the arrangement disclosed therein, for example, the wavelengths 532, 632 and 780 nm are used and a working range of 0.6 mm with unique assignment of the distance difference is achieved.

Further preferred embodiments of the invention are described below. These alternative preferred embodiments are part of the invention without loss of generality.

Thus, the use of TDI technology in the proposed arrangement serves only to improve the signal-to-noise ratio and is not absolutely necessary for the principle according to the invention. Therefore, for simpler measurement configurations and requirements, instead of using TDI multi-channel camera line sensors as ellipsometry sensors 220, 222, 224, an arrangement of 4 independent line sensor cameras or of 4 independent, single-channel TDI line sensor cameras can also be selected.

Alternatively, common area scan cameras can also be used, or TDI single channel line scan cameras operated in area readout mode. In such an arrangement, the clock frequency is reduced accordingly to, e.g., a clock of 1 kHz (for the described area readout mode of a TDI single-channel line scan camera) and more than 16 million height values per second are still obtained.

It is understood that when using area scan cameras or TDI single channel line scan cameras in area readout mode, the three wavelengths $\lambda_1$, $\lambda_2$ and $\lambda_3$ are mapped on the camera sensors to different lines x=1, 2, 3. The assignment of the obtained signal images to each other for the three wavelengths, which each look at the same point on the wafer surface 40, is carried out here by a spatial assignment of the areas of the camera sensor. For the analysis shown in principle above, it is irrelevant whether the assignment is made spatially (for area sensors) or in a chronologically staggered manner (for line sensors).

It should be noted that for applications of high lateral resolution (e.g. in the single-digit μm range), a lateral and rotational correction for the recorded signal images is necessary anyway due to the use of several cameras since an adjustment of the entire measuring arrangement to an offset of the camera of less than 1 μm is hardly achievable in a mechanical manner. Such mathematical correction can usually be made possible by capturing a reference pattern from which the exact location on the wafer viewed by each pixel can be determined.

In further possible embodiment variants, the number of wavelengths used can be adapted to the required working area. For particularly small working areas, a configuration with only one wavelength is possible, or with two wavelengths for small areas. For larger working areas or an improvement of the reliability by redundancy of the measurement, the extension to three or more wavelengths is suitable, which can be implemented in particular with the above mentioned multi-block TDI cameras (cameras with 7 TDI blocks have already been presented).

The illumination can suitably be provided by continuous monochromatic light sources. Lasers are suitable for this purpose, as are other broadband beam sources combined with appropriate interference filters. The only condition is that the coherence length of the light used is sufficiently large for the working range to be implemented.

The combination of the radiation when using different wavelengths can be achieved by spliced optical fibers or dichroic mirrors. Spliced optical fibers are optical fibers that are fused together in a certain section or are routed close to each other so that the light passes from one optical fiber to the other optical fiber. In the case of dichroic mirrors, only the light of a certain wavelength range is reflected while the light of at least one other wavelength range is transmitted. Such mirrors can be dimensioned for use at different angles. The most common use occurs at 45°. With a suitable arrangement, the outgoing reflected light and the transmitted light can thus have the same direction of propagation.

For the separation of light beams of different wavelengths in the ellipsometry beam path, one or more prisms, gratings or other spectral dispersive means can be used instead of dichroic mirrors. The spatial separation allows the signals to be recorded simultaneously, which allows high a measurement speed. However, temporal separation can also be done by carrying out the measurement sequentially at the different wavelengths, wherein a longer measurement time is accepted.

Likewise, instead of the beam divider 91 or a mirror 90, a glued prism with a square cross-section can be used, which is provided with a partially reflecting layer in the glued 45° surface. When such a prism is used, the reference arm can be created by vapor depositing a mirror coating directly onto the outer surface of the prism. Although this arrangement leads to a reduction of the interference contrast due to the significantly different dispersion in the reference and measuring arm of the interferometer, it is advantageous for simple requirement due to its robustness.

In particular, it can be provided that the optical arrangement for generating interference comprises a semi-transparent mirror which reflects part of the radiation at a first surface towards the object surface and transmits another part of the radiation. The reflected radiation can then be combined with the transmitted beam. This can be done, for example, by reflecting the transmitted beam back into itself at a mirror and coupling it into the reflected beam at the semi-transparent mirror. Such an arrangement is called a Michelson interferometer. However, other arrangements are also possible and usable, such as a so-called Mach-Zehnder interferometer, in which the irradiated light is split and recombined after reflection of a sub-beam at the sample surface.

Further preferred variants are already described in the patent application EP19188318, which is to be included herein in its entirety as a reference.

LITERATURE (1) "Multi-Wavelength Interferometry for Length Measurements Using Diode Lasers", K. Meiners-Hagen, R.

Schrödel, F. Pollinger, A. Abou-Zeid, Measurement Science Review, Vol. 9, Sect. 3, 01.11.2009

(2) "Handbook of Ellipsometry", Harland G. Tompkins, Eugene A. Irene, Springer 2005, ISBN 0-8155-1499-9

The invention claimed is:

1. A device for measuring a profile of an object surface of a flat object comprising unknown materials, comprising:
   a beam splitter for splitting a light beam of a light source;
   an optical interferometry measuring system and an ellipsometry measuring system for simultaneously measuring a measurement region on the object surface; and
   an analysis unit, wherein:
   a) the optical interferometry measuring system comprises:
      a beam divider for dividing an interferometry light beam of a light source into a reference beam and a measuring beam;
      a reference mirror for reflecting the reference beam;
      a detector unit for receiving and analyzing an analysis beam of the optical interferometry measuring system, wherein
      the measuring beam is directed to a measurement region on the object surface for reflection and, after reflection, is directed as an object beam to the beam divider,
      the reference beam is reflected at the mirror and directed as a mirror beam to the beam divider, and
      the object beam and the mirror beam interfere after impinging on the beam divider and are fed as an analysis beam to the detector unit for analyzing;
   b) the ellipsometry measuring system comprises:
      a polarizer for polarizing an ellipsometry light beam and routing the ellipsometry light beam to the measurement region on the object surface; and
      an ellipsometry sensor having a polarization filter configured to analyze a polarization state of a receiving sensor beam,
      wherein the ellipsometry light beam is directed to the measurement region on the object surface and, after reflection at the measurement region of the object surface, impinges on the ellipsometry sensor as a sensor beam;
   c) the beam splitter is designed for splitting a light beam of the light source into the interferometry light beam and the ellipsometry light beam; and
   d) the analysis unit is designed to simultaneously process the analysis beam analyzed in the detector unit and the sensor beam received in the ellipsometry sensor and to determine a profile height in the measurement region on the object surface without using material parameters of the unknown materials of the object to be measured, wherein
   a correction of measurement results of the detector unit is performed in the analysis unit based on:
      (i) an effective refractive index determined with the ellipsometry measuring system of the object to be measured;
      (ii) an effective absorption coefficient determined with the ellipsometry measuring system of the object to be measured; and
      (iii) an effective layer thickness of a substitute layer which combines an effective optical effect of one or more layers of the object, and
   (i), (ii), and (iii) are used to calculate a real reflection coefficient and a phase shift of the object beam.

2. A system for measuring the profile of an object surface of a flat object comprising unknown materials, comprising:
   a light source for generating a monochromatic light beam;
   the device according to claim 1; and
   a movement unit for performing a relative movement between the device and the object to be measured.

3. The system according to claim 2, wherein
   the movement unit moves at least one of the device and the object, and
   during a movement of the object, a holder for receiving the object is provided, and the holder is moved by the movement unit.

4. The device according to claim 1, wherein at least one of the beam divider and the beam splitter is a semi-transparent mirror.

5. The device according to claim 1, wherein a lens is provided in a beam path which directs light beams such that the polarized ellipsometry light beam impinges on the measurement region on the object surface at a predetermined angle and the measuring beam impinges on the measurement region on the object surface at a right angle.

6. The device according to claim 1, wherein
   mirrors are provided in a beam path of the ellipsometry light beam, and
   the mirrors perform at least one of: directing the ellipsometry light beam perpendicularly onto the polarizer; and directing the sensor beam perpendicularly onto the ellipsometry sensor.

7. The device according to claim 6, wherein tube optics are provided in a beam path upstream of at least one of: the detector unit, the tube optics focusing the analysis beam on the detector unit; and the ellipsometry sensor, the tube optics focusing the sensor beam on the ellipsometry sensor.

8. The system according to claim 2, wherein the light source is a laser diode.

9. The system according to claim 2, wherein the light source has a monitor diode that determines and monitors an output intensity of the light source.

10. The system according to claim 2, wherein a plurality of light sources is provided for generating monochromatic light beams, the monochromatic light beams have different wavelengths, no wavelength of a monochromatic light beam is an integral multiple of a wavelength of another monochromatic light beam, and the monochromatic light beams are bundled by beam-shaping optics.

11. The system according to claim 10, comprising:
    a plurality of ellipsometry sensors for determining the polarization state of a receiving sensor beam.

12. The device according to claim 1, comprising:
    an optical separating element for wavelength-specific separating of the sensor beam, which is arranged in such a manner that separating the sensor beam takes place before the sensor beam impinges on the ellipsometry sensor.

13. The system according to claim 2, wherein the ellipsometry sensor comprises a plurality of polarization filters such that for analyzing the polarization state of a received sensor beam a plurality of polarization directions are recorded and analyzed.

14. The system according to claim 13, wherein
    the device comprises an optical separating element for wavelength-specific separating of the sensor beam, which is arranged in such a manner that separating the sensor beam takes place before the sensor beam impinges on the ellipsometry sensor, and
    the optical separating element is a dichroic mirror.

15. The device according to claim 1, wherein the detector unit comprises a time-delayed integration camera.

16. The device according to claim 1, wherein the ellipsometry sensor comprises a time-delayed integration camera.

17. A method for detecting a surface profile of an object surface of an object comprising unknown materials by means of an interferometric measurement and a simultaneous ellipsometry measurement, comprising:
- emitting a monochromatic light beam towards an optical device by means of a light source;
- splitting a light beam of the light source into an interferometry light beam and an ellipsometry light beam by means of a beam splitter;
- performing an interferometric measurement with the interferometry light beam at a measurement region of the object surface by means of an optical interferometry measuring system;
- performing a measurement of a monitor signal of the light source to determine an output intensity of the light source;
- simultaneously with the interferometric measurement, performing an ellipsometry measurement at the measurement region of the object surface by means of an optical ellipsometry measurement system;
- calculating correction parameters using results of the ellipsometry measurement and taking into account the output intensity of the light source;
- correcting of measurement values obtained with the interferometry measurement by means of the correction parameters;
- determining a profile height of the measurement region at the object surface of the object comprising the unknown materials taking into account the corrected measurement values by means of an analysis unit, and without using material parameters of the unknown materials of the object to be measured, wherein the correcting is based on:
- (i) an effective refractive index determined with the ellipsometry measuring system of the object to be measured;
- (ii) an effective absorption coefficient determined with the ellipsometry measuring system of the object to be measured; and
- (iii) an effective layer thickness of a substitute layer which combines an effective optical effect of one or more layers of the object, and
- (i), (ii), and (iii) are used to calculate a real reflection coefficient and a phase shift of the object beam.

18. The method according to claim 17, wherein the correction parameters comprise at least one of: an effective refractive index; an effective absorption coefficient; an effective layer thickness of a substitute layer which combines an effective optical effect of one or more layers of the object of the just measured material combination at each measuring point.

* * * * *